(12) United States Patent  
Cooper et al.

(10) Patent No.: US 7,930,232 B2  
(45) Date of Patent: *Apr. 19, 2011

(54) DERIVING A PROBABILITY DISTRIBUTION OF A VALUE OF AN ASSET AT A FUTURE TIME

(75) Inventors: Philip A. Cooper, Lincoln, MA (US); Stewart Myers, Lexington, MA (US); G. David Forney, Jr., Cambridge, MA (US); Leonard L. Scott, Jr., Charlottesville, VA (US); Lisette Cooper, Lincoln, MA (US)

(73) Assignee: Athena Capital Advisors, Inc., Lincoln, MA (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/139,669

(22) Filed: Jun. 16, 2008

(65) Prior Publication Data

US 2008/0270322 A1 Oct. 30, 2008

Related U.S. Application Data

(63) Continuation of application No. 11/750,709, filed on May 18, 2007, now Pat. No. 7,555,454, which is a continuation of application No. 09/641,589, filed on Aug. 18, 2000, now Pat. No. 7,236,953.

(51) Int. Cl.  
*G06Q 40/00* (2006.01)  
(52) U.S. Cl. .................................. 705/36 R  
(58) Field of Classification Search .................. None  
See application file for complete search history.

(56) References Cited

U.S. PATENT DOCUMENTS

| | | | |
|---|---|---|---|
| 5,148,365 | A | 9/1992 | Dembo |
| 6,021,397 | A | 2/2000 | Jones et al. |
| 6,061,662 | A | 5/2000 | Makivic |
| 6,263,321 | B1 | 7/2001 | Daughtery, III |
| 6,456,982 | B1 | 9/2002 | Pilipovic |
| 2002/0065755 | A1 | 5/2002 | Shlafman et al. |

OTHER PUBLICATIONS

B. Dumas, J. Fleming and R.E. Whaley, "Implied volatility functions: Empirical tests", *J. Finance*, vol. 53, pp. 2059-2106 (Dec. 1998).

Britten-Jones et al., "Option Prices, Implied Price Processes, and Stochastic Volatility", The Journal of Finance, vol. LV, No. 2, Apr. 2000, pp. 839-966.

D. T. Breeden and R. H. Litzenberger, "Prices of state-contingent claims implicit in option prices," *J. Business*, vol. 51, pp. 631-650 (1978).

Hull, John C., "Options, Futures, and Other Derivatives" (Fourth Edition, 1999; Prentice-Hall).

J. C. Jackwerth and M. Rubinstein, "Recovering probability distributions from option prices," *J. Finance*, vol. 51, pp. 1611-1631 (1996).

Mendenhall et al., "A Brief Course in Business Statistics", Wadsworth Publishing Company, Belmont, CA 1995, p. 177.

U.S. Appl. No. 09/641,589, Cooper et al., filed Aug. 18, 2000.

U.S. Appl. No. 11/750,709, Cooper et al., filed May 18, 2007.

(Continued)

*Primary Examiner* — Jason M Borlinghaus  
(74) *Attorney, Agent, or Firm* — Fish & Richardson P.C.

(57) ABSTRACT

Data are received that represents current prices of options on a given asset. An estimate is derived from the data of a corresponding implied probability distribution of the price of the asset at a future time. Information about the probability distribution is made available within a time frame that is useful to investors, for example, promptly after the current option price information becomes available.

12 Claims, 9 Drawing Sheets

OTHER PUBLICATIONS

Wadsworth, Harrison M., "The Handbook of Statistical Methods for Engineers & Scientists". $2^{nd}$ Edition. McGraw-Hill. New York, NY. pp. 6.1-6.3.

http://valuengine.com/servlet/ValuationSummary, ValuEngine Inc., Jun. 28, 2001.

Makridakis et al., "Forecasting Methods and Applications". $3^{rd}$ Edition. John Wiley & Sons. Danvers, MA. pp. 13-16 and 82 (1998).

Melick et al., "Recovering an Asset's Implied PDF from Option Prices: An Application to Crude Oil during the Gulf Crisis". Journal of Financial and Quantitative Analysis, vol. 32, No. 1, pp. 91-115, Mar. 1997.

Wadsworth, Harrison M., "The Handbook of Statistical Methods for Engineers & Scientists". $2^{nd}$ Edition. McGraw-Hill. New York, NY. pp. 6.1-6.3, Dec. 1, 1997.

www.bloomberg.com, Bloomberg L.P., Jun. 27, 2001.
www.cbeo.com, Chicago Board Options Exchange, Jun. 14, 2000.
www.contingencyanalysis.com, Contingency Analysis, Jul. 20, 2000.
www.etrade.com, E*TRADE Securities, Inc., Jun. 27, 2001.
www.nyse.com, NYSE, Inc., Jun. 28, 2001.
www.optionetics.com, Global Investments Research Corp., Jun. 20, 2000.
www300.fidelity.com, Fidelity Investments Institutional Services Company, Inc., Jun. 27, 2001.

Nelsen, Roger B., "An Introduction to Copulas", 1998 (copyright 1999), 5 pages.

Barra, "United States Equity Model", version 3 (ES): Model Handbook, 1999, 160 pages.

Barra, "Aegis System", Alphabuilder (U.S.): Returns Forecasting: Model Handbook, 1998, 79 pages.

US 7,930,232 B2

DERIVING A PROBABILITY DISTRIBUTION OF A VALUE OF AN ASSET AT A FUTURE TIME

CLAIM OF PRIORITY

This application is a continuation of and claims the benefit of priority from U.S. patent application Ser. No. 11/750,709, filed on May 18, 2007, which is a continuation of U.S. patent application Ser. No. 09/641,589 (now U.S. Pat. No. 7,236,953), filed Aug. 18, 2000, the entire contents of both of which are hereby incorporated by reference.

BACKGROUND

This invention relates to generating and providing information about expected future prices of assets.

Among the kinds of information available at web sites on the Internet are current and historical prices and volumes of stock transactions, prices of put or call options at specific strike prices and expiration dates for various stocks, and theoretical prices of put and call options that are derived using formulas such as the Black-Scholes formula. Some web sites give predictions by individual experts of the future prices or price ranges of specific stocks.

A call option gives the holder a right to buy an underlying marketable asset by an expiration date for a specified strike price. A put option gives an analogous right to sell an asset. Options are called derivative securities because they derive their values from the prices of the underlying assets. Examples of underlying assets are corporate stock, commodity stock, and currency. The price of an option is sometimes called the premium.

People who buy and sell options are naturally interested in what appropriate prices might be for the options. One well-known formula for determining the prices for call and put options under idealized conditions is called the Black-Scholes formula. Black-Scholes provides an estimate of call or put prices for options having a defined expiration date, given a current price of the underlying asset, an interest rate, and the volatility rate (sometimes simply called volatility) of the asset. Black-Scholes assumes constant interest rates and volatility, no arbitrage, and trading that is continuous over a specified price range.

SUMMARY

In general, in one aspect, the invention features a method in which data is received that represents current prices of options on a given asset. An estimate is derived from the data of a corresponding implied probability distribution of the price of the asset at a future time. Information about the probability distribution is made available within a time frame that is useful to investors, for example, promptly after the current option price information becomes available.

Implementations of the invention may include one or more of the following features. The data may represent a finite number of prices of options at spaced-apart strike prices of the asset. A set of first differences may be calculated of the finite number of prices to form an estimate of the cumulative probability distribution of the price of the asset at a future time. A set of second differences may be calculated of the finite number of strike prices from the set of first differences to form the estimate of the probability distribution function of the price of the asset at a future time.

In general, in another aspect, the invention features a method in which a real time data feed is provided that contains information based on the probability distribution.

In general, in another aspect, the invention features a method that includes providing a graphical user interface for viewing pages containing financial information related to an asset; and when a user indicates an asset of interest, displaying probability information related to the price of the asset at a future time.

In general, in another aspect, the invention features a method that includes receiving data representing current prices of options on a given asset, the options being associated with spaced-apart strike prices of the asset at a future time. The data includes shifted current prices of options resulting from a shifted underlying price of the asset, the amount by which the asset price has shifted being different from the amount by which the strike prices are spaced apart. An estimate is derived from a quantized implied probability distribution of the price of the asset at a future time, the elements of the quantized probability distribution being more finely spaced than for a probability distribution derived without the shifted current price data.

In general, in another aspect, the invention includes deriving from said data an estimate of an implied probability distribution of the price of the asset at a future time, the mathematical derivation including a smoothing operation.

Implementations of the invention may include one or more of the following features. The smoothing operation may be performed in a volatility domain.

In general, in another aspect, the invention includes deriving a volatility for each of the future dates in accordance with a predetermined option pricing formula that links option prices with strike prices of the asset; and generating a smoothed and extrapolated volatility function.

Implementations of the invention may include one or more of the following features. The volatility function may be extrapolated to a wider range of dates than the future dates and to other strike prices. The smoothed volatility function may be applicable to conditions in which the data is reliable under a predetermined measure of reliability. The implied volatility function formula may have a quadratic form with two variables representing a strike price and an expiration date. The coefficients of the implied volatility function formula may be determined by applying regression analysis to approximately fit the implied volatility function formula to each of the implied volatilities.

In general, in another aspect, the invention features a method that includes receiving data representing current prices of options on assets belonging to a portfolio, deriving from the data an estimate of an implied multivariate distribution of the price of a quantity at a future time that depends on the assets belonging to the portfolio, and making information about the probability distribution available within a time frame that is useful to investors.

In general, in another aspect, the invention features a method that includes receiving data representing values of a set of factors that influence a composite value, deriving from the data an estimate of an implied multivariate distribution of the price of a quantity at a future time that depends on assets belonging to a portfolio, and making information about the probability distribution available within a time frame that is useful to investors.

Implementations of the invention may include one or more of the following features. The mathematical derivation may include generating a multivariate probability distribution function based on a correlation among the factors.

In general, in another aspect, the invention features a graphical user interface that includes a user interface element adapted to enable a user to indicate a future time, a user interface element adapted to show a current price of an asset, and a user interface element adapted to show the probability distribution of the price of the asset at the future time.

In general, in one aspect, the invention features, a method that includes continually generating current data that contains probability distributions of prices of assets at future times, continually feeding the current data to a recipient electronically, and the recipient using the fed data for services provided to users.

In general, in another aspect, the invention features a method that includes receiving data representing current prices of options on assets belonging to a portfolio, receiving data representing current prices of market transactions associated with a second portfolio of assets, and providing information electronically on the probability that the second portfolio of assets will reach a first value given the condition that the first portfolio of assets reaches a specified price at a future time.

In general, in another aspect, the invention features a method that includes receiving data representative of actual market transactions associated with a first portfolio of assets; receiving data representative of actual market transactions associated with a second portfolio of assets; and providing information on the expectation value of the price of first portfolio of assets given the condition that the second portfolio of assets reach a first specified price at a specified future time through a network.

In general, in another aspect, the invention features a method that includes evaluating an event defined by a first multivariate expression that represents a combination of macroeconomic variables at a time T, and estimating (e.g., using Monte Carlo techniques) the probability that a second multivariate expression that represents a combination of values of assets of a portfolio will have a value greater than a constant B at time T if the value of the first multivariate expression is greater than a constant A. The market variables represented by the first multivariate expression can include macroeconomic factors (such as interest rates), market preferences regarding the style of company fundamentals (large/small companies, rapid/steady growth, etc.), or market preferences for industry sectors.

In general, in another aspect, the invention features a method that includes defining a regression expression that relates the value of one variable representing a combination of macroeconomic variables at time T to a second variable at time T that represents a combination of assets of a portfolio, and estimating the probability that the second variable will have a value greater than a constant B at time T if the value of the first variable is greater than a constant A at time T, based on the ratio of the probability of x being greater than A under the regression expression and the probability of x being greater than A.

In general, in another aspect, the invention features a method that includes defining a current value of an option as a quadratic expression that depends on the difference between the current price of the option and the current price of the underlying security, and using Monte Carlo techniques to estimate a probability distribution of the value at a future time T of a portfolio that includes the option.

The invention takes advantage of the realization that option prices for a given underlying asset are indicative of the market's prediction of the risk-neutral price of the underlying asset in the future (e.g., at the expiration of the option). A risk-neutral price for an asset is one which would occur in a world in which investors had no aversion to (or appetite for) the risks inherent in investments. Option price data may be used to derive the market's prediction in the form of an implied probability distribution of future risk-neutral prices. The shape of this distribution can then be used as a guide to understanding the distribution of future real-world prices.

The implied probability distribution and other information related to it may be made easily available to people for whom the information may be useful, such as those considering an investment in the underlying asset, or a brokerage firm advising such an investor.

Among the advantages of the invention are one or more of the following: Investors and prospective investors in an underlying asset, such as a publicly-traded stock, are given access to a key additional piece of current information, namely calculated data representing the market's view of the future price of the stock. Brokerage firms, investment advisors, and other companies involved in the securities markets are able to provide the information or related services to their clients and customers.

Other features and advantages will become apparent from the following description and from the claims.

DESCRIPTION

Details of implementations of the invention are set forth in the figures and the related description below.

FIGS. 1, 2, and 3 are graphs.

FIG. 4 is a block diagram.

FIGS. 5, 6, and 7 are web pages.

Figure 1:
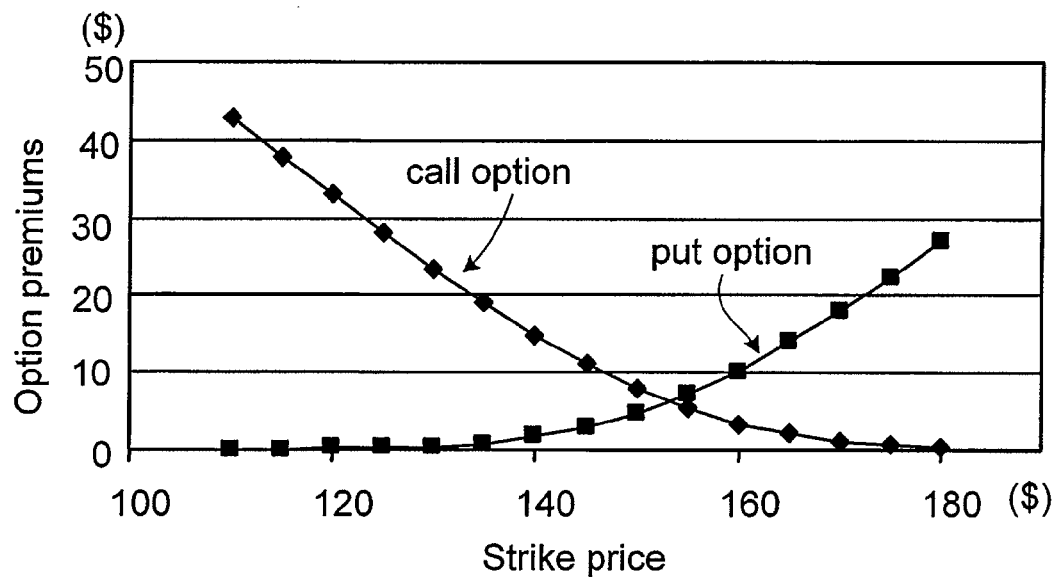

In general, the price of a call or put option is determined by buyers and sellers in the option market and carries information about the market's prediction of the expected price of the underlying asset at the expiration date. (The information does not include the premium that investors require for bearing risk, which must be estimated separately. The average long-term value of the risk premium is about 6% per year for all stocks and may be adjusted for an individual stock's historical responsiveness to broader market movements.)

The information carried in the prices of options having various strike prices and expirations is used to derive probability distributions of the asset's price at future times and to display corresponding information to investors, for example, on the World Wide Web.

Basic Method

We first define some relevant terms. We define x as the strike price, $c(x)$ as the theoretical call price function (the price of the call as a function of strike price), $p(x)$ as the theoretical put price function, $F(x)$ as the cumulative distribution function (cdf) of the price of the underlying asset at expiration; and $f(x)$ as the probability density function (pdf) of the asset price at expiration. By definition, $f(x)=F'(x)$ (i.e., the probability density function is the derivative of the cumulative distribution function). We assume the options are exercisable only on the expiration date, i.e., they are "European-style" options. Even allowing for possible early exercise, ("American-style" options) most liquidly traded call options without large dividends can be treated as if there were no possibility of such exercise, since sale of the option is usually a better alternative; therefore, these call options behave similarly to European-style options. The actual call and put prices are established by options market-makers. Such prices implicitly contain information about a market view of the probability distribution of the price of that asset at the expiration date.

In a simple but precise form, this market view can be stated as follows. Suppose that we were given the call price curve c(x) or the put price curve p(x) as a continuous function of the strike price x for all x>0. Then, the second derivative of either the call or the put price curve is the market view of the risk-neutral probability density function (pdf) $f(x)$ of the asset price at the expiration date. The relationship between c(x), p(x), $f(x)$, and F(x) can be succinctly stated as:

$$F(x)=c'(x)+1=p'(x); \tag{1a}$$

$$f(x)=c''(x)=p''(x). \tag{1b}$$

In words, the pdf is the second derivative of either the call price function or of the put price function A simple proof these relationships follows. As in Hull, we may calculate the European call or put price as an expected value in the risk-neutral distribution.

If the actual value of the asset on the expiration date is v, then the value of a call option at strike price x is max $\{v-x, 0\}$, and the value of a put option is max$\{x-v, 0\}$. If the actual value is a random variable with pdf $f(v)$, then the expected value of a call option at x at the expiration date is $$c_T(x) = E_v[\max\{v-x, 0\}] = \int_x^\infty (v-x)f(v)dv, \tag{2a}$$

and the expected value of a put option at x at the expiration date is $$p_T(x) = E_v[\max\{x-v, 0\}] = \int_0^x (x-v)f(v)dv. \tag{2b}$$

The current values c(x) and p(x) may be obtained by discounting $c_T(x)$ and $p_T(x)$ by $e^{-rT}$, where r is the risk-free interest rate, but for our purposes, forecasting probability distributions at time T, we do no discounting, and henceforth just write $c(x)=c_T(x)$, $p(x)=p_T(x)$.

Parenthetically, from these expressions we observe that $$p(x) - c(x) = \int_x^\infty (x-v)f(v)dv = x - E_v[v] = x - s^* \tag{2c}$$

where $s^*=E_v[v]$ is the expected value of the asset at the expiration date under the risk-neutral distribution. (If there are no dividends, then $s^*=se^{rT}$; if there are dividends, then in general it is necessary to subtract from $se^{rT}$ the value at time T of the dividends.) This well-known relation is called put-call parity; it shows why either price curve carries the same information.

From the above expression for c(x), it follows that its first derivative is $$c'(x) = -\int_0^\infty f(x)dx = F(x) - 1, \tag{3}$$

where $$F(x) = \int_0^\infty f(v)dx$$

is the cumulative distribution function (cdf) of the random variable v. To prove this, note that $$v - x = \int_x^v dx.$$

Therefore $$\begin{aligned} c(x) &= \int_x^\infty (v-x)f(v)dv \\ &= \int_x^\infty dv \int_x^v dz f(v) \\ &= \int_x^\infty dz \int_z^\infty dv f(v) \\ &= \int_x^\infty dz (1 - F(z)) \end{aligned} \tag{4}$$

where we interchange the variables v, z to integrate over the two-dimensional region $\mathbb{R}=\{(v, z): x \leq z \leq v\}$. The last expression implies that c'(x)=-(1-F(x)).

From put-call parity, it follows similarly that $$p'(x)=1+c'(x)=F(x). \tag{5}$$

Since the cdf and pdf are related by F'(x)=$f(x)$, these expressions in turn imply that the second derivative of either c(x) or p(x) is the pdf $f(x)$:

$$c''(x)=p''(x)=F'(x)=f(x). \tag{6}$$

The general character of the option price curves c(x) and p(x) is therefore as follows:

For all x less than the minimum possible value of v (i.e., such that F(x)=0), c(x)=Ev[v]-x=s*-x and p(x)=0. In other words, c(x) is a straight line of slope −1 starting at c(0)=E$_v$[v]=s*, while p(x)=0.

For all x greater than the maximum possible value of v (i.e., such that F(x)=1), c(x)=0 and p(x)=x-s*. In other words, p(x) is a straight line of slope +1 and x-intercept s*, while c(x)=0.

These two line segments are joined by a continuous convex ∪ curve whose slope increases from −1 to 0 for c(x), and from 0 to +1 for p(x).

We note that the fact that the mean E[v] of the pdf $f(x)$ is s*, the value in future dollars at time T of the underlying price s (less the value of any dividends), implies that option prices must be constantly adjusted to reflect changes in the underlying price s, even if there is no market activity in the options.

The fact that s*=E[v] also implies that an option price curve can make no prediction about the general direction of the underlying price s. However, the option price curve does predict the shape of the pdf $f(x)$, and in particular its volatility.

This so-called "second-derivative method" for computing implied probability distributions from option price data is known in the academic literature, but apparently not very well known. For example, the standard textbook "Options, Futures, and Other Derivatives," by John C. Hull (Fourth Edition, 1999; Prentice-Hall) mentions implied probabilities, but not the second-derivative method. Perhaps the best reference that we have been able to find is J. C. Jackwerth and M. Rubinstein, "Recovering probability distributions from option prices," J. Finance, vol. 51, pp. 1611-1631 (1996), which has only six prior references. This paper cites D. T. Breeden and R. H. Litzenberger, "Prices of state-contingent claims implicit in option prices," J. Business, vol. 51, pp. 631-650 (1978) as the originator of a second-derivative method, although the latter paper nowhere mentions probabilities.

The risk-neutral distribution (at a fixed future time T, for a fixed asset) is defined as the price distribution that would hold if market participants were neutral to risk, which they generally are not. However, many asset pricing theories, such as those underlying Black-Scholes option theory and most of the variations found in the Hull book above, allow for the true risk-averse asset price distribution to be obtained from the risk-neutral distribution $f(x)$ just by adjusting the latter by an appropriate risk premium: If there are no dividends, the true distribution is just $f(xe^{(\mu-r)T})$, where $\mu-r$ is the expected annual return rate for the stock in excess of the risk free rate r. We use a variation on this simple format, slightly modified to allow for dividends (see below), though our invention could also work well with a more complicated adjustment. In this format, a value for $\mu-r$ must still be supplied. We use as a default the "consensus estimate" taken from the textbook "Active Portfolio Management" (1995) by Grinold and Kahn. These authors note a long-term average value of the risk premium to be 6% per year, and suggest multiplying this number by the stock's beta to get $\mu-r$. The parameter beta is the slope of the line giving a regression of the stock in question against a market portfolio, often taken as the S&P 500. This is the well-known CAPM estimate for the expected excess return. Whether good or bad, its stature as a consensus estimate makes it suited to our aim of providing a market view, though it is only a default. Our invention, which provides the risk-neutral component of the probabilities, could work with other estimates for the risk-averse adjustment parameter $\mu-r$ and with any explicit scheme for adjusting the risk neutral probability density to the risk-averse probability density. It is worth pointing out that, for shorter time periods-even a month or two—the risk adjustment required is small and generally overwhelmed by fluctuations in the risk-neutral distribution itself.

Approximating $f(x)$ from Finite Bid and Ask Option Prices

Equations (1a) and (1b) are obtained by assuming that the variable x is continuous and ranges from 0 to infinity. In practice, options are usually traded within certain price ranges and only for certain price intervals (e.g., ranging from $110 to $180 at $5 intervals). Thus, the call and/or put option prices are known only for a finite subset of strike prices. Under such circumstances, estimates of Equations (1a) and (1b) can be computed by taking differences instead of derivatives as follows.

We assume that the option prices c(x) and p(x) are quoted for a finite subset of equally-spaced strike prices $x=n\Delta$, where n is an integer, and $\Delta$ is the spacing between quoted prices. Define $c_n=c(n\Delta)$, $p_n=p(n\Delta)$. Then the first derivatives c'(x) and p'(x) at $x=(n+\frac{1}{2})\Delta$ may be estimated by the first differences:

$$\hat{c}'_{n+1/2} = \frac{c_{n+1} - c_n}{\Delta}; \tag{7a}$$

$$\hat{p}'_{n+1/2} = \frac{p_{n+1} - p_n}{\Delta}. \tag{7b}$$

The corresponding estimates of the cumulative distribution function: $\hat{F}_{n+1/2}=F((n+\frac{1}{2})\Delta)$ are $$\hat{F}_{n+1/2}=1+\hat{c}'_{n+1/2} \tag{8a}$$

$$\hat{F}_{n+1/2}=\hat{p}'_{n+1/2} \tag{8b}$$

The second derivatives c"(x) and p"(x) at $x=n\Delta$ may likewise be estimated by the second differences, i.e., differences of the estimates of the first derivatives:

$$\hat{c}''_n = \frac{c'_{n+1/2} - c'_{n-1/2}}{\Delta} = \frac{c_{n+1} - 2c_n + c_{n-1}}{\Delta^2}; \tag{9a}$$

$$\hat{p}''_n = \frac{p_{n+1} - 2p_n + p_{n-1}}{\Delta^2}. \tag{9b}$$

Either of these estimates of the second derivatives may be used as an estimate of the probability density values at $x=n\Delta$, i.e., $f(n\Delta)$:

$$\hat{f}_n = \hat{p}''_n \text{ or } \hat{f}_n = \hat{c}''_n \tag{10}$$

Figure 2:
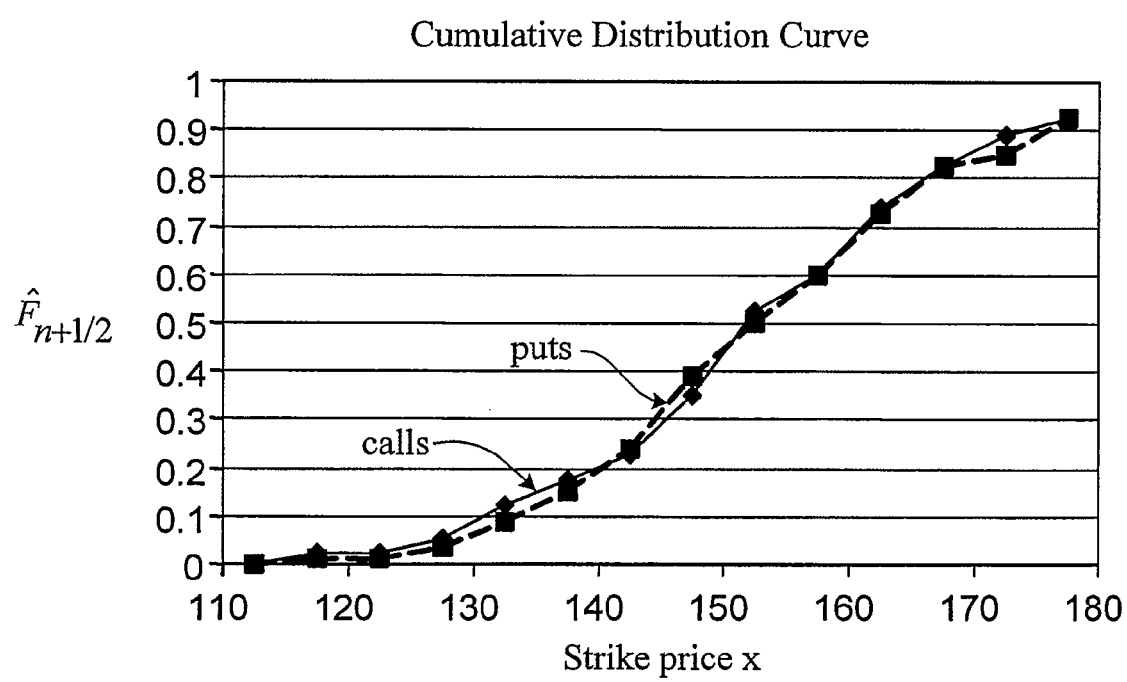
Figure 3:
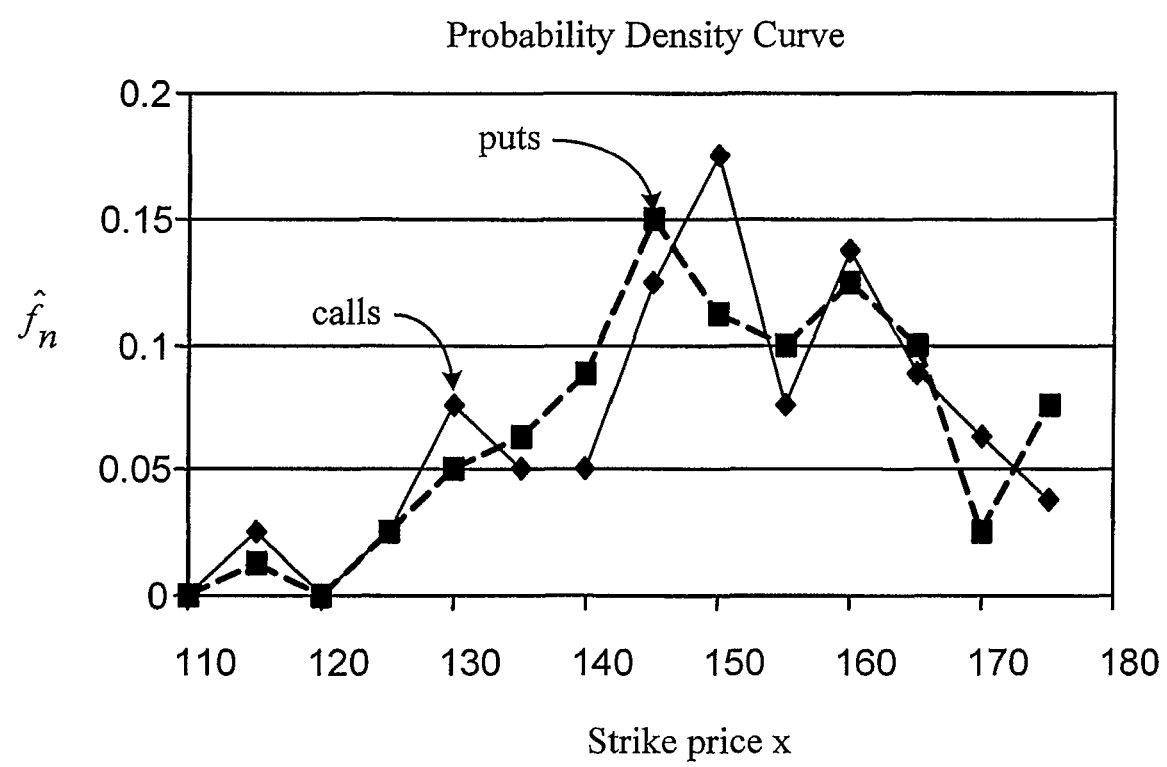

Moreover, the market prices of call and put options are usually given in terms of a bid-ask spread, and thus either the bid price or the ask price (or some intermediate value) may be used as the call or put option price. By using the bid and ask prices for both the call option and the put option, four estimates of F(x) and $f(x)$ may be obtained. These estimates may be combined according to their reliability in any desired way. For example, one might use the estimate derived from the put bid price curve for values of x less than the current price s of the underlying asset, and the estimate derived from the call bid price curve for values of x greater than s. Examples of $c_n$, $p_n$, $\hat{F}_{n+1/2}$, and $\hat{f}_n$ are shown in FIGS. 1, 2, and 3 using the data of TABLE 1 (see below). This combination will preferably take into account whether $x=(n+\frac{1}{2})\Delta$ is much less than the underlying price s ("deep out-of-the-money"), near s ("near the money"), or much greater than s ("deep in-the-money"), according to the different patterns of setting bid-asked spreads in these different ranges. Another consideration is avoiding quotes near prices where early exercise is likely, such as deep in-the-money puts.

Similarly, the second derivatives c"(x) and p"(x) at $x=n\Delta$ may be estimated by the first differences of the estimates of the first derivatives; e.g., $$\hat{c}''_n = \frac{\hat{c}'_{n+\frac{1}{2}} - \hat{c}'_{n-\frac{1}{2}}}{\Delta} = \frac{c_{n+1} - 2c_n + c_{n-1}}{\Delta^2}. \tag{11}$$

We may take $\hat{c}''_n$, or $\hat{p}''_n$, or some combination as above as our estimate $\hat{f}_n$ of the pdf $f(n\Delta)$.

Note that since $f(x) \geq 0$, option prices should satisfy a convexity condition, e.g., $c_{n+1}-2c_n+c_{n-1} \geq 0$ for call option prices. Indeed, violation of this condition would allow making money via a risk-free "butterfly straddle" involving buying one call option $(n+1)\Delta$ and another at $(n-1)\Delta$, and selling two call options at $n\Delta$. A similar result holds for put options.

Tabular Data

TABLE 1 below shows sample bid prices of call and put options for strike prices of an asset ranging from $110 to $180 at $5 intervals and the cumulative distribution values $\hat{F}_{n+1/2}$ and probability density values $\hat{f}_n$ computed according to Equations (7)-(10) above.

In the table, the values for $\hat{F}_{n+1/2}$ correspond to strike prices that are mid-way between the two strike prices used to compute $\hat{F}_{n+1/2}$. Thus, the cumulative distribution value shown to the right of the strike price $110 actually corresponds to the strike price $112.5, and the value to the right of the strike price $115 actually corresponds to strike price $117.5, and so forth.

| Strike price | Call price | $\hat{F}_{n+1/2}$ from call price | $\hat{f}_n$ from call price | put price | $\hat{F}_{n+1/2}$ from put price | $\hat{f}_n$ from put price |
|---|---|---|---|---|---|---|
| 110 | 42⅞ | 0 | 0 | ⅛ | 0 | 0 |
| 115 | 37⅞ | 0.025 | 0.025 | ⅛ | 0.0125 | 0.0125 |
| 120 | 33 | 0.025 | 0 | 3/16 | 0.0125 | 0 |
| 125 | 28⅛ | 0.05 | 0.025 | ¼ | 0.0375 | 0.025 |
| 130 | 23⅜ | 0.125 | 0.075 | 7/16 | 0.0875 | 0.05 |
| 135 | 19 | 0.175 | 0.05 | ⅞ | 0.15 | 0.0625 |
| 140 | 14⅞ | 0.225 | 0.05 | 1⅝ | 0.2375 | 0.0875 |
| 145 | 11 | 0.35 | 0.125 | 2¹³⁄₁₆ | 0.3875 | 0.15 |
| 150 | 7¾ | 0.525 | 0.175 | 4¾ | 0.5 | 0.1125 |
| 155 | 5⅜ | 0.6 | 0.075 | 7¼ | 0.6 | 0.1 |
| 160 | 3⅜ | 0.7375 | 0.1375 | 10¼ | 0.725 | 0.125 |
| 165 | 2¹⁄₁₆ | 0.825 | 0.0875 | 13⅞ | 0.825 | 0.1 |
| 170 | 1³⁄₁₆ | 0.8875 | 0.0625 | 18 | 0.85 | 0.025 |
| 175 | ⅝ | 0.925 | 0.0375 | 22¼ | 0.925 | 0.075 |
| 180 | ¼ | | | 26⅞ | | |

Dynamic Estimates for F(x) and $f(x)$.

In Equations (7)-(10), the call and put option prices were assumed to be static in the calculation of the cumulative distribution function F(x) and probability density function $f(x)$ for a finite subset of strike prices $x=n\Delta$. In the real world, the price s of the underlying asset changes with time, and there will be a corresponding change in option prices. As a first order approximation, if the price s increases by a small amount $\delta$, then the option price curves will effectively shift to the right by the amount $\delta$. As a result, the price $c(x)$ or $p(x)$ now quoted at strike price x may be used as an estimate for the option price on the previous price curve at strike price $x'=x-\delta$. As a result, the prices on the previous curve at a new discrete subset of strike prices $x=n\Delta-\delta$ become effectively visible.

The methods considered in the previous subsection allow estimation of the cdf and pdf at a subset of $\Delta$-spaced values of x based on a static set of option quotes at a particular time.

As previously noted, however, option prices must change continually in response to changes in the underlying price s. Let s* denote the corresponding forward price at expiration (the price s evaluated with interest). Suppose this price (measured in dollars at expiration) moves up (or down) by a small amount, an increment $\epsilon$ in its logarithm, say, with little or no change in volatility. Here $\epsilon$ may be viewed as, approximately, the percentage move $\delta/s^*$ caused by a move of $\delta$ in the (forward) stock price. We expect in this situation that (forward) probability distribution for the stock price will just be shifted by $\epsilon$ in the log domain. That is, the distribution will appear to be identical there, except with a mean shifted by $\epsilon$. Thus, the value of the new cdf at $x=e^{ln\ x}$ is $F(e^{(ln\ x - \epsilon)}) = F(x/a)$, where F denotes the original cdf with distribution mean s*, and $a=e^\epsilon$. A reasonable call price functional equation that gives the same effect, upon differentiation, is $$ac(s^*, x/a) = c(as^*, x), \quad (12)$$

where c(s*, x) denotes the price, in dollars at expiration, for a call option at strike x when the underlying is at price s. Note in this equation that all other variables, such as volatility, are assumed to be the same, which will only be approximately true, even for very small values of $\epsilon$.

But, assuming this approximation, we can think of an option price at strike x, measured when the (forward) price has moved to as*, for a near 1, as giving instead a times the price of an option at strike x/a, but corresponding to the current underlying price s*. Considering all the strikes at which options are frequently quoted, and thinking additively, we can effectively observe c(x) (and p(x)) for a different subset of approximately equally-spaced strike prices, roughly $x=n\Delta-\delta$ for various values of $\delta=\epsilon s^*$. Some care must, of course, be taken to ensure simultaneity of prices, of option and underlying. For this reason, we may prefer to consider the values of $n\Delta$ (corresponding to the various standard strike values) separately, and synchronize observed time of sales for an option at a given strike with the underlying security. Implied volatilities (discussed below) could be monitored, to ensure their changes relative to $\epsilon$ were small.

Using a similar technique to that described in the above paragraphs, meaningful average option prices for a given strike can also be computed, using thin strike intervals and using either short time intervals or time series methods (time averages weighting the present more than the past). Note that, without the framework described in this subsection, the computation of "average" option prices at a given strike are problematic when the stock price varies in the period over which the average is taken.

Given enough movements of the underlying price, therefore, we can effectively compute estimates of c(x), p(x), F(x) and/or $f(x)$ for a subset of strike prices x that is much more closely spaced than the subset available at any one time.

Extrapolating and Smoothing Probability Distributions

In a typical options market, the option prices are available only for certain expiration dates. In addition, the option prices are more reliable for options that are actively traded, which are typically nearer-term options at strike prices near the underlying price. It is therefore desirable to extrapolate and interpolate probability distributions to times other than actual expiration dates and to wider ranges of strike prices.

Any standard extrapolation and smoothing techniques may be used directly on the cumulative distribution values $\hat{F}_{n+1/2}$ or probability density values $\hat{f}_n$ to give a smoothed and extrapolated estimate of F(x) or $f(x)$. Similarly, given such estimated curves for a discrete subset of future times T, standard interpolation and extrapolation techniques may be used to estimate such curves for other specified values of T, or for a continuous range of T>0.

A less direct but useful approach is to perform extrapolation and smoothing on an implied volatility function, which is then used to calculate the other functions, such as c(x), p(x), F(x), and $f(x)$. The volatility rate of an asset (often simply called its volatility) is a measure of uncertainty about the returns provided by the asset. The volatility rates of a stock may typically be in the range of 0.3 to 0.5 per year.

An advantage of performing extrapolation and smoothing on implied volatility curves is that different types of volatility curves (so-called "volatility smiles") are known and can be used as a guide to the extrapolation and smoothing process to prevent "overfitting" of certain unreliable data points. Many records have been kept of the volatilities implied by option prices, and it is easy to examine how in the past they have changed with respect to price behavior. For example, the Chicago Board of Options Exchange makes public its average near-the-money volatility index (now called VIX) for S&P 100 options back to 1986. Finally, it is easier to work visually with volatility curves, which would theoretically be flat if $f(x)$ were lognormal, than with visual differences in near-lognormal pdfs, which can all look very much alike. Mathematically, model improvements can be made in the volatility domain just by changing coefficients of low-degree polynomial approximations, even though these affect higher-order terms in power series for the corresponding cdfs or pdfs.

The standard method of computing implied volatilities is to invert the Black-Scholes pricing formula for the actual call price c(x) or put price p(x) of an underlying asset at a given strike price x, given the underlying price s (current price of asset), risk-free rate of interest r, and T (expiration date). When this is done for a range of values of x, an estimate of an implied volatility curve σ(x) is obtained. This curve may be smoothed and extrapolated by any standard method to give a smoothed curve $\tilde{\sigma}(x)$. Then corresponding smoothed put and call price curves may be computed using the Black-Scholes pricing formula and differentiated once or twice to give a smoothed cdf or pdf. Finally, given such estimated curves for a discrete subset of future times T, standard interpolation and extrapolation techniques may be used to estimate such curves for other specified values of T, or for a continuous range of T>0.

For example, the standard Black-Scholes theory of option pricing (see Hull, op. cit.) yields a lognormal pdf $f(v)$ whose expected value is $E[v]=s^*$, such that ln v is a Gaussian (normal) random variable with variance $\sigma^2 T$, where the parameter σ is called the volatility rate of the asset, and T is the time to expiration. By a standard property of lognormal distributions, this implies that the mean of ln v is $E_v[\ln v]=\ln s^*-\sigma^2 T/2$.

From this pdf follows the famous Black-Scholes call option pricing formula [Hull, Appx. 11A]:

$$c(x)=E_v[\max\{v-x,0\}]=s^*N(d_1(x))-xN(d_2(x)), \quad (13)$$

where N ($d_1(x)$) and N ($d_2(x)$) are values of the cumulative distribution function of a Gaussian random variable of mean zero and variance 1 at the points $$d_1(x) = \frac{\ln(s^*/x) + \sigma^2 T/2}{\sigma\sqrt{T}} = d_2(x) + \sigma\sqrt{T}; \quad (14)$$

$$d_2(x) = \frac{\ln(s^*/x) - \sigma^2 T/2}{\sigma\sqrt{T}} = \frac{E_v[\ln v] - \ln x}{\sigma\sqrt{T}}. \quad (15)$$

(Recall that our version of the call price is not discounted, and is given in dollars at time T, and that $s^*$ is today's stock price, valued in dollars at time T, less the value of any dividends.) Note that $\sigma\sqrt{T}$ is the standard deviation of ln v; therefore $-d_2(x)$ is just ln x, measured in standard deviations from the mean $E_v[\ln v]$.

Similarly, by put-call parity, we have the Black-Scholes put option pricing formula $$p(x)=c(x)+x-s^*=s^*(N(d_1(x))-1)-x(N(d_2(x))-1)=xN(-d_2(x))-s^*N(-d_1(x)). \quad (16)$$

Taking the derivative with respect to x, and using $s^*N'(d_1(x))=xN'(d_2(x))$ and $d_1'(x)=d_2'(x)$ (the latter equation holding under the assumption of constant volatility, which we will later drop), we obtain $$F(x)=c'(x)+1=-N(d_2(x))+1=N(-d_2(x)). \quad (17)$$

Now F(x) is the probability that v≦x, which is equal to the probability that ln v≦ln x, which since ln v is Gaussian with mean $E_v[\ln v]$ and standard deviation $\sigma\sqrt{T}$ is given by $$F(x) = Pr\{v \le x\} \quad (18)$$
$$= Pr\{\ln v \le \ln x\}$$
$$= N\left(\frac{\ln x - E_v[\ln v]}{\sigma\sqrt{T}}\right)$$
$$= N(-d_2(x)).$$

Thus we have verified that the Black-Scholes pricing formulas give the correct cdf F(x). The derivative of F(x) will thus yield the correct lognormal distribution $f(x)=F'(x)$.

Now let F(x) be an arbitrary cdf on $\mathbb{R}_+$; i.e., a function that monotonically increases from 0 to 1 as x goes from 0 to infinity. For simplicity we will assume that F(x) is strictly monotonically increasing; i.e., $f(x)=F'(x)>0$ everywhere. Then there exists a continuous one-to-one "warping function" $y:\mathbb{R}_+\to\mathbb{R}$ such that $F(x)=N(y(x))$ everywhere; i.e., such that the probability that a random variable v with cdf F(x) will satisfy v≦x. is equal to the probability that a standard Gaussian random variable n with mean zero and variance 1 will satisfy n≦y(x). Similarly, there is an inverse warping function x(y) such that $F(x(y))=N(y)$.

Given the warping function y(x), the cdf F(x) may be retrieved from the relation $F(x)=N(y(x))$. Therefore the cdf F(x) completely specifies the warping function y(x), and vice versa; i.e., both curves carry the same information.

If F(x) is the cdf of a lognormal variable v such that ln v has mean $E_v[\ln v]=\ln s^*-\sigma^2 T/2$ and variance $\sigma_v^2=\sigma^2 T$, as above, then the warping function is given by $$y(x) = -d_2(x) = \frac{\ln x - (\ln s^* - \sigma^2 T/2)}{\sigma\sqrt{T}} = \frac{\ln x - E_v[\ln v]}{\sigma_v}. \quad (19)$$

For this reason we may sometimes write y(x) as $-d_2(x)$, even when the cdf is not lognormal so that the right-hand equation above for $d_2(x)$ does not hold.

If $f(x)$ is not lognormal, then the Black-Scholes pricing formulas do not hold. Another new way to compute implied volatilities is first to compute a finite subset of cdf values $\hat{F}_{n+1/2}$ and then to invert the Black-Scholes cdf formula at these values. Given an option price c(x) or p(x), it is common practice to define the implied volatility σ(x) as the value of σ such that the Black-Scholes pricing formula holds, for a given x, s and T. The implied volatility curve σ(x) so defined is a function of the strike price x, which is constant if and only if the pdf $f(x)$ is actually lognormal. In practice, it is typically a convex ∪ curve, called a "volatility smile." See, e.g., Hull, Chapter 17.

When this is done for a range of values of x, an estimate of a generally different implied volatility curve $\sigma_1(x)$ is obtained, called the cdf-implied volatility curve, which represents the value of σ such that the Black-Scholes cdf formula $F(x)=N(-d_2(x,\sigma,T))$ holds, for a given x, s and T. Again, this curve may be smoothed and extrapolated by any standard method to give a smoothed curve $\tilde{\sigma}_1(x)$. Then a corresponding smoothed cdf may be computed from the Black-Scholes cdf formula, and differentiated once to give a smoothed pdf. Finally, again, given such estimated curves for a discrete subset of future times T, standard interpolation and extrapolation techniques may be used to estimate such curves for other specified values of T, or for a continuous range of T>0.

Some advantages of using the cdf-implied volatility curve rather than the conventional implied volatility curve are that the computations are simpler, at least from an estimate of F(x). In particular, it gives a simpler and arguably more intuitive relationship between volatility and the cdf F(x). If we use the traditional implied volatility σ(x), then the relationship is instead $$F(x) = N(-d_2(x)) + \frac{\partial c}{\partial \sigma}\sigma^2(x). \quad (20)$$

Another advantage is that it fits better with the multivariate techniques to be discussed below.

We have observed that the two curves $\sigma(x)$ and $\sigma_1(x)$ seem to be fairly similar, at least as to the direction of their slope, and are generally not too far apart in value "near the money." Also $\sigma_1(x) = \sigma(x)$ whenever $\sigma(x)$ has zero slope, though $\sigma_1(x)$ is a little smaller than $\sigma(x)$ when the slope $\sigma_1(x)$ is negative (which often occurs for stocks). See the above equation. Finally, one function is as ad hoc as the other. Therefore, because of the above reasons, we generally prefer to use the cdf-implied volatility curve $\sigma_1(x)$.

In any case, it is clear that either $\sigma(x)$ or $\sigma_1(x)$ contains the same information as any of the curves $c(x)$, $p(x)$, $F(x)$ or $f(x)$. From $\sigma(x)$ or $\sigma_1(x)$ we can recover $c(x)$ or $F(x)$ using the Black-Scholes call option pricing or cdf formula, and from this we can obtain all other curves.

A particular method for finding a smoothed and extrapolated implied volatility curve $\tilde{\sigma}^1(x, T)$ as a function of both strike price x and time T to expiration is as follows.

The volatility curve $\sigma(x)$ or $\sigma_1(x)$ may be calculated pointwise from the corresponding curve $c(x)$ or $p(x)$ to give a set of values at a finite subset of strike prices x. Each of these values may be deemed to have a certain degree of reliability.

It is then a standard problem to fit a smoothed and extrapolated curve to these points, taking into account their relative reliabilities. Any standard smoothing and extrapolation method may be used. In general, the usual problems of avoiding overfitting or oversmoothing must be addressed.

It is well-known that implied volatilities also vary with time. Wt! generally wish to estimate curves $\tilde{\sigma}(x,T)$ or $\tilde{\sigma}_1(x,T)$ as replacements for the constant volatility $\sigma$ in the Black-Scholes formulas, e.g., $c(x) = c(x, \sigma, T)$ or $F(x) = N(-d_2(x, \sigma, T))$.

In an especially meaningful example, we have experimented with a class of smoothing algorithms used in "Implied volatility functions: Empirical tests," by B. Dumas, J. Fleming and R. E. Whaley, J. Finance, vol. 53, pp. 2059-2106, December 1998. These authors fit an implied volatility curve $\sigma(x)$, for the purpose of setting up a "straw man" option price model for testing (and defeating) a theory regarding the role of volatility in option pricing. Their "straw man" option pricing model $c(x)$ was obtained by putting the resulting smoothed curve back into the Black-Scholes call formula. It is a "straw man" ad hoc model, because no intuitive notion of stock volatility could possible vary with strike price, which the stock never "sees." Nevertheless, their model performed admirably, surpassing in predictive power the highly regarded "implied tree" method. One possible explanation offered was that their model mimicked in a smooth way interpolation methods actually employed by practitioners in the options markets. (See the discussion of "Volatility matrices" in Hull, cited above.) Such an approach to option pricing seems ideal to us, because of its accuracy and because its underlying rationale represents a market view.

Thus, we use the Dumas-Fleming-Whaley model for our own entirely different purpose, that of forecasting probability distributions. All that is necessary is to differentiate their call price model, which, conveniently for us, is a smooth function of strike price and other standard variables such as time, current stock price, and the risk-free rate of interest. The formula for the cdf $F(x)$ is, as before, this derivative with 1 subtracted, or $$F(x) = N(-d_2(x)) + \frac{\partial c}{\partial \sigma}\sigma'(x). \quad (21)$$

We can make this very explicit. We have $$\frac{\partial c}{\partial \sigma} = x\sqrt{T}N'(-d_2(x)) \quad (22)$$

where $N'(z)$ denotes standard normal density, while $\sigma'(x)$ may be computed by differentiating the Dumas-Fleming-Whaley fitted volatility curve. The latter has the form $$\tilde{\sigma}_1(x,T) = a_0 + a_1 x + a_2 x^2 + a_3 T + a_4 + a_5 xT. \quad (14)$$

The coefficients $\{a_i\}$ are determined by regression to fit the available data regarding $\sigma_1(x, T)$ as closely as possible. Given the smoothed curve $\tilde{\sigma}_1(x, T)$, corresponding smoothed cdfs for different xs and Ts) may be computed from the Black-Scholes cdf formula for each time T, and differentiated once to give a smoothed pdf. An alternative procedure, with numerical advantages, is to use a quadratic fit like the above for a function $\tilde{\sigma}(x,T)$, and then invert the Black-Scholes cdf to find $\tilde{\sigma}_1(x, T)$. Another useful variation is to fit $\tilde{\sigma}(x,T)$ with a quadratic function of x at times T which are specific expiration dates, then linearly interpolate at other times T.

This kind of quadratic curve-fitting is easily implemented. Dumas-Fleming-Whaley impose a constraint to prevent their volatilities from going below 0 (or even below 0.01), and we have imposed further constraints on extrapolations (which we often carry out beyond the range of their tests), to ensure that the final cdf does not go below zero or above one. We have experimented with other variations; on their basic approach, for example, using linear interpolation in the time domain, where we do not need-to take derivatives. Our methods would, of course work, with any approach, possibly quite different, to volatility curve-fitting, though the general Dumas-Fleming-Whaley approach has many things going for it: accuracy, conformity to marketplace use of Black-Scholes, smoothness differentiability, in particular), conformity to historical experience regarding the smile structure of volatility curves (especially important for extrapolation), and simplicity (which, beyond ease of implementation, helps avoid overfitting). These advantages are achieved in a probability context that was not considered in the paper where these volatility curves were introduced.

Treatment of Multiple Assets

The techniques described so far give probability distributions for the future values of a single asset based on option price data for that asset. However, in many cases an investor may be concerned with multiple assets, for example all of the stocks in his or her portfolio, or in a mutual fund, or in a certain index. The investor may also be concerned with a security without a quoted option or a security in a hypothetical scenario. Moreover, the investor may be concerned with the relations between one group of assets and another.

All of these questions involve considerations of several securities at once, and the probabilities of their simultaneous configuration of prices. This is clearly a consideration in stock portfolios and mutual funds, but also enters when dealing with securities without quoted option prices, where we would want to extract as much information as possible about the security from those correlated with it that do have quoted options. Finally, in scenario analysis there are many questions that involve considering the probabilities of several security prices occurring at once, including changes in factors influencing the market that might be modeled by changes in a portfolio of those securities most affected.

For a portfolio of securities, or a mutual fund, we are interested in a composite asset of the form $$x = h_1 x_1 + h_2 x_2 + \ldots + h_n x_n, \quad (24)$$

where the $x_i$ are all assets for which we individually know the cdf $F(x_i)$ or the pdf $f(x_i)$. To give our method the most flexibility, we do not require that this knowledge come from any particular procedure, though we favor the approach of the preceding two sections. However, even for some securities or indices with a quoted option, we might not feel there was sufficient option activity to justify a full fit of a volatility curve, and might take a cruder substitute, even a flat straight line based on an average of available implied volatilities. In addition, it is convenient to allow the possibility that a few assets we are monitoring might not have any quoted option at all; this is easily accommodated by, say, using a flat volatility curve with a historical value for volatility. For testing purposes and comparisons we might even want to consider a list of assets with volatility curves given this way.

A general method for dealing with such questions is to generate multivariate probability distributions for all assets of interest. A multivariate cdf may be written as $F(x_1, x_2, \ldots, x_n)$, where the variables $(x_1, x_2, \ldots, x_n)$ are the values of the n assets of interest.

We will assume that we know from the techniques described above or otherwise the marginal cdfs $F_i(x_i)$ for each of the individual variables. As a first step, we may define for each $x_i$ a function $y_i(x_i)$, called a "warping function," such that $y_i(x_i)$ is a standard normal (Gaussian) variable with mean 0 and variance 1. This is simply done by defining $y_i(x_i)$ such that $F_i(x_i) = N(y_i(x_i))$ for all values of x, where $N(x)$ denotes the cdf of a standard normal variable. The function $y_i(x_i)$ may be simply described in terms of $\sigma_1(x_i)$. Under mild technical conditions such as having a marginal cdf that varies monotonically, such a warping function $y_1(x_i)$ has a well-defined inverse warping function $x_i(y_i)$.

If the asset has an active options market, then the warping functions may be determined by either first estimating $F(x_i)$ directly from (finite differences of) options price data or by extrapolating and smoothing in the volatility domain. In the latter case we have an explicit form of the warping function $y_i(x_i)$ in terms of a fitted volatility curve $\bar{\sigma}_1(x_i, T)$ as $y_i(x_i) = -d_2(x_i, \bar{\sigma}_1(x, T), T)$, and this equation can also be used with any volatility curve with the assets above, that might have fewer or no traded options. In a later section we will discuss portfolios in the logarithm domain, possibly containing long and short positions. One can think of warping them to standard normal directly, subtracting the mean and dividing by the standard deviation. Alternately, to keep our notation uniform, one can invent an asset with price $x_i$ such that $-d_2(x_i)$ gives this warped value (using for $\sigma_1(x)$ the observed historical volatility). But we wish to emphasize that the method we are describing works with ANY single-variable warping functions, even using a different one for each variable. The only further substantive ingredient is the plausibility of using JOINTLY normal distributions, which we now discuss.

The general problem is to find a multivariate probability distribution for the complete set of variables $(x_1, \ldots, x_n)$, or equivalently for their logarithms. In simple financial models generalizing the Black-Scholes framework, the multivariate distribution of the logvariables is multivariate (i.e., jointly) normal; see Musiela and Rutkowski's book "Martingale methods in financial markets" (1999). This implies that all portfolios of these logvariables are jointly normal, and can also be used with other logvariables and portfolios of them to form a jointly normal distribution. Thus, if we wish, it is reasonable to use BARRA (or functionally equivalent) factors as single (log)variables in our model, using, say, individual normal distributions for them based on historical volatility. These factors may represent fundamentals of companies or even macroeconomic variables such as interest rates. We do not further discuss such factors, but refer to the book of Grinold and Kahn cited above, which also describes how to closely approximate them as portfolios of security returns. Our preference is to not use BARRA factors directly, but stay as much as possible in the world of optionable securities, and address questions involving BARRA factors in terms of approximating portfolios consisting mostly of optionable securities. (But for testing and comparisons, it is still useful to be able to include them directly, and we do have that capability.)

Now we certainly do not wish to use only the simple multidimensional Back-Scholes model, which would not directly allow the non-lognormal input from our single-variable distributions based on the options markets. At the same time, option prices on individual assets do not tell us anything about how assets interact, in particular, their correlations. Fortunately, correlations may be estimated from past (historical) data, and may be viewed as covariances for data that has been standardized (has standard deviation 1). Each multivariate normal distribution is determined by its mean and covariance matrix. Thus, a natural approach is to use the individual distributions to transform or "warp" the variables to standard normal, then impose a multivariate normal structure based on the correlation matrix. This procedure is independent of the individual warping functions, which may be different for different individual variables, and in particular, can incorporate our market-based option distributions for individual variables representing securities with active options markets. A slightly different approach is to use correlations of the warped variables. This procedure is likely to be more accurate, but may involve more computational time.

Second, we assume that we can find the historical pairwise correlations between the warped standard normal variables $y_i(x_i)$. These correlations may be computed by standard techniques from any available set of historical asset price data. We denote by C the n×n historical correlation matrix of the log variables $(\ln v_1, \ldots, \ln v_n)$, whose entries are the cross-correlations $$\rho_{ij} = \frac{E(\ln v_i \ln v_j) - E(\ln v_i)E(\ln v_j)}{\sqrt{E(\ln v_i)^2 E(\ln v_j)^2}}. \quad (25a)$$

As before, it is notationally convenient to use $v_i$ as a second notation for $x_i$, favoring the latter for fixed values and the former as a variable. Because each of the variables $y_i(x_i)$ is standard normal, the diagonal terms $\rho_{ii}$ of C are all equal to 1, and C is a positive semi-definite covariance matrix, which we may here assume to be nonsingular (positive definite).

If we use instead correlations of warped variables, we have simply $$\rho_{ii} = E(y_i y_j). \quad (25b)$$

Now let $F_C(x_1, \ldots, x_n)$ denote the cdf of a multivariate Gaussian random n-tuple with zero mean and covariance matrix C. Thus, $F_C(b_1, \ldots, b_n)$ is the probability that each variable $y_i$ is at most some value $b_i$. There are more elaborate versions, such as $F_C(a_1, \ldots, a_n; b_1, \ldots, b_n)$, giving the probability that each $y_i$ satisfies $a_i \leq y_i \leq b_i$. In the single-variable case these latter functions are obtained from the simple cdf by a single subtraction, involving two terms, but the corresponding bivariate case involves four terms, and in n dimensions there would be $2^n$ terms. However, each of these more elaborate cdfs can be directly computed as an integral, just like the simple cdf. Since the more elaborate cdfs are needed for Monte Carlo calculations, possibly in high dimensions, it is best to think of them as being computed directly.

We then define the multivariate cdfs $$F(x_1, x_2, \ldots, x_n) = F_C(y_1(x_1), y_2(x_2), \ldots, y_n(x_n)) \quad (26)$$

and $$F(a_1, \ldots, a_n; b_1, \ldots b_n) = F_C(y_1(a_1), \ldots, y_n(a_n); y_1(b_1), \ldots, y_n(b_n)) \quad (27)$$

where the $y_i(x_i)$ are the known warping functions for the individual variables. We find it convenient, with some abuse of language, to speak of $F(x_1, \ldots, x_n)$ as "the cdf", even though we have all of the above functions in mind, and to use $F(x_1, \ldots, x_n)$ as a proxy for the whole distribution (which it does, theoretically, determine). Then $F(x_1, x_2, \ldots, x_n)$ is a multivariate cdf that (a) has the correct (given) marginal cdfs $F_i(x_i)$; and (b) has the correct (historical) correlations between the warped standard normal variables $y_i(x_i)$. We use this cdf to answer questions involving the variables $(x_1, x_2, \ldots, x_n)$. That is, since the marginals of $F_C(z_1, \ldots, z_n)$ are Gaussian with mean 0 and variance 1, the marginals of $F(x_1, \ldots, x_n)$ are equal to $N(y_i(x_i))=F(x_i)$; i.e., they are correct according to each single-variable model. If the logvariables ($\ln v_1, \ldots, \ln v_n$) are actually jointly Gaussian, then the multivariate cdf $F(x_1, \ldots, x_n)$ is correct.

In summary, the true joint distribution is approximated by a jointly lognormal distribution using historical correlations, combined with warping functions on each variable such that the marginal distribution of each variable is correct according to a selected single-variable model (for example, according to our single-variable model for optionable securities, or according to the lognormal model using historical volatility). The single variables may actually be portfolios, with a default distribution for the portfolio return being lognormal, based on historical volatility. This multivariate theory generalizes both our single-variable theory and standard multivariate (log) Gaussian models. It again allows for market input through option prices, to the extent that components have an active option market, but does not exclude non-optionable securities, and also allows portfolios as single variables. In this way BARRA (or functionally equivalent) factors are also allowed because of their interpretation as portfolios of long and short positions.

For example, the investor might have a portfolio consisting of a given quantity of each of these assets. The value of such a portfolio is the sum $$x = h_1 x_1 + h_2 x_2 + \ldots + h_n x_n, \quad (28)$$

where $h_i$ is an arbitrary coefficient that represents the quantity of the ith asset in the portfolio. The investor might be interested in an estimate of the probability distribution of the value x of the whole portfolio.

Such an estimate may be obtained by Monte Carlo simulation. For such a simulation, a large number N of samples from the multivariate Gaussian cdf $F_C(y_1, \ldots, y_n)$ may be generated. Each sample $(y_1, \ldots, y_n)$ may be converted to a sample $(x_1, x_2, \ldots, x_n)$ by using the inverse warping functions $x_i(y_i)$. The value x of the total portfolio may then be computed for each sample.

From these N values of x, the probability distribution of x (e.g., its cdf $F(x)$) may be estimated:

$$x = h_1 x_1(y_1) + \ldots + h_n x_n(y_n). \quad (29)$$

After enough samples, we will have an approximation to the cdf of x. More precisely, the probability that $a \leq x \leq b$ is, approximately, the average number of samples $y_1, \ldots, y_n$ with $a \leq h_1 x_1(y_1) + \ldots + h_n x_n(y_n) \leq b$, and this approximation becomes exact in the limit for large sample sizes. This works for real portfolios, or for portfolios constructed from a number of asset and a residual variable, as might arise from a regression. Usually the regression is done in the log domain, which we discuss below. Note that the Monte Carlo method just described works perfectly well if the expression for x above is replaced by any function $f(x_1, \ldots, x_n)$ of the $x_i$, possibly quite nonlinear.

In practice, it is useful to save the N multivariate samples in a large database. Then the cdf of any quantity whose value is a function of the variables $(x_1, x_2, \ldots, x_n)$ may be estimated from this database. For example, if the investor would like to know the cdf of some alternative portfolio with different quantities of each asset, this can be quickly determined from the stored database.

An investor may also determine the effect of one portfolio (or event(s) or variables such as interest rates, P/E ratios, public interest in a certain sector of the market) on another portfolio as follows. Assume that the first portfolio is represented by x, where $$x = h_1 x_1 + h_2 x_2 + \ldots + h_n x_n \quad (30)$$

where each $x_i$ may be viewed as the price of a portfolio component, and the second portfolio is represented by y, where $$y = g_1 x_1 + g_2 x_2 + \ldots + g_n x_n. \quad (31)$$

where each $y_i$ may be viewed as the price of a portfolio component or more broadly as any macro-economic variable (macroeconomic, fundamental, or sector related).

In some examples, these methods can be used with another paradigm in common use in the financial community. It is common to work in the return domain, or equivalently, with logarithms; i.e., $$\ln x = \beta_1 \ln x_1 + \ldots \beta_n \ln x_n. \quad (32)$$

Ignoring any possible identification of these variables with those used above, the same discussion and Monte Carlo method as above applies, if we regard x as a nonlinear portfolio $x = f(x_1, \ldots, x_n) = \exp(\beta_1 \ln x_1 + \ldots \beta_n \ln x_n)$. If the sum B of the $\beta_i$s is 1, such an x may be written $x = \hat{h}_1 x_1 + \hat{h}_2 x_2 + \ldots + \hat{h}_n x_n$ where $\hat{h}_i = \beta_i x/x_i$. Even if B is not 1, incremental changes ("returns") d ln x computed from this equation for x are consistent with the above expression for ln x. It is common in the financial community to think of $\hat{h}_i$ as approximately a constant $h_i$, so that for short periods, where the $x_i$s do not change too much, this equation for x is comparable to the portfolio equation in the previous subsection. Thus, $$\hat{h}_i = \frac{dx_i}{x} \beta_i \frac{dx_i}{x_i} = \beta d \ln x_i$$

so that for small changes $dx_i$ the change dx from the first equation is approximately the same as would be obtained from the second. However, this relationship requires "rebalancing" to remain a good approximation for longer periods.

For an asset x not given explicitly in terms of the terms of the $x_i$, we obtain a similar expression via linear regression:

$$\ln x = \beta_0 \ln x_0 + \beta_1 \ln x_1 + \ldots + \beta_n \ln x_n. \quad (33)$$

The $\beta_i$ for $i \neq 0$ are correlation coefficients chosen to minimize the variance of the residual in historical data (perhaps subject to constraints, such as $\beta i \geq 0$ and $\Sigma_{i=1}{}^n \beta_i = 1$). For example, x might be a security without a quoted option, and the $x_i$ for $i \neq 0$ could be taken as assets for which we individually know the probability distributions, in addition to the required correlation coefficients for x. We have written the residual term as $\beta_0$ in $x_0$ (usually thinking of $\beta_0 = 1$ and the residual as normally distributed; For the residual term i=0, we can use a constant variance or impose some generic non-constant structure based on observed behavior). The mean of the latter could be nonzero, giving the regression "alpha"—a constant term making the mean of the regression correct. Alternatively, we could modify the equation to allow an explicit alpha, and keep the residual mean zero. Another minor variation might include the addition of a dummy variable with constant return, to adjust the value of x up or down. In particular, this gives another way of adjusting the residual mean to zero. This equation gives the previous one as a special case if we allow $\beta_0 = 0$.

Another approach, which promises to be relatively fast computationally, is the following. As in the development of cdf-implied volatilities in Section 2, let us assume that each logvariable in $x_i$ above is "Gaussian" with non-constant variance $\sigma(x_i)^2 T$. In other words, the cdf is given by $F(x_i) = N(-d_2(x_i, \sigma_1(x_i), T))$. Our aim will be to give F(x) by a similar equation, using some kind of fitted curve $\sigma_1(x)$. We will assume that we have some class of volatility curves in mind, with a small number of parameters which must be determined.

If the variables i$\ln x_0, \ldots, \ln x_n$ were truly jointly Gaussian, then ln x would also be Gaussian. Its variance would be given by the formula $$\text{Var}(\ln x) = \sum_{ij} \beta_i \sigma_i \rho_{ij} \beta_j \sigma_j T, \quad (34)$$

where $\rho_{ij}$ is the correlation between $\ln x_i$ and $\ln x_j$, and $\sigma_i^2 T = \text{Var}(\ln x_i)$. We therefore define the estimate $\hat{\sigma}_1(x)$ of $\sigma_1(x)$ by the conditional expectation $$\hat{\sigma}_1(x) = E\left(\beta_i \sigma_1(x_i) \rho_{ij} \beta_j \sigma_1(x_j) \mid \ln x = \sum_i \beta_i \ln x_i\right). \quad (35)$$

The calculation of the above conditional expectation may be done with Monte Carlo methods. In the language of nonlinear portfolios above, we would take the function $f(x_1, \ldots, x_n)$ to be 0 outside a thin multidimensional solid enclosing the hyperplane defined by $\ln v = \Sigma_i \beta_i \ln v_i$. Inside the solid we would take $f(x_1, \ldots, x_n)$ equal to the above expansion for Var(ln x), divided by the probability of being in the solid (also a Monte Carlo calculation). In terms of samples, we just take the average of Var (in x) over all the samples that end up inside the thin solid. However, it is not necessary to compute all values of $\hat{\sigma}_1(x)$, but only enough to fit the parameters h r the volatility curves we are using.

The estimated mean of ln x would be $\ln s^* \frac{1}{2} \hat{\sigma}_1(x)^2$, with $s^*$ determined as before, or replaced with some risk-averse estimate, to obtain the risk-averse or "true" distribution. (It is common, incidentally, to use factor models such as these to estimate a risk-averse version of $\ln s^* = \Sigma_i \beta_i \ln s_i^*$ from risk-averse values of $s_i^*$.)

Also, we mention here one useful variation: We may prefer not to view the residual term $\beta_0 \ln x_0$ as part of the model, and instead write down a joint pdf only for in $x_i, \ldots, \ln x_n$. In this case we can use the double expectation $$\hat{\sigma}_1(x) = E\left(E\left(\sum_{ij} \beta_i \sigma_1(x_i) \rho_{ij} \beta_j \sigma_1(x_j) \mid \ln x = \sum_i \beta_i \ln x_i\right)\right), \quad (36)$$

where the inner expectation is with respect to the variables $x_i$, $x_2, \ldots, x_n$) and the outer expectation is with respect to the residual. We might take the standard deviation $\sigma(x_0)$f the residual (taking $\beta_0 = 1$) as a constant, determined historically, or make an estimate based on some leverage model.

Now we can estimate the cdf F(x) by $$\hat{F}(x) = N(-d_2(x, \hat{\sigma}_1(x), T)) \quad (37)$$

as in the univariate case. To summarize, we use our multivariate model to determine parameters for a univariate model of the portfolio. After that is done, we can obtain probabilities for the portfolio without having to go back to the multivariate model, thus achieving a savings in time. We could take this one step further and think of randomly generating values of $\sigma_1(x, T)$ independently of any Monte Carlo philosophy (but perhaps still throwing away values of x too far out of the money), and then using the values obtained to do the regression required in the Dumas-Fleming-Whaley approach.

In another example, the multivariate distribution lends itself to the study of many questions regarding conditional probabilities. For example, suppose that we want to know the effect of an increase or decrease of some segment of the market on a portfolio, or of an increase or decrease of some macro-economic factor. BARRA, following earlier ideas of Ross viewed such macro-economic factors as portfolios with both long and short positions. Similarly, BARRA considers market segments associated to price-to-earnings ratios and other fundamental parameters, as well as to industry groupings, as portfolios. (See the book of Grinold-Kahn cited above.) Thus, we are led simply to consider the effect of one portfolio on another.

Consider the "what-if" question: letting A and B be given positive constants, if $x \geq A$ at time T, what is the probability that $y \geq B$ at time T. This question can be answered by creating a Monte Carlo database as above for the multivariate cdf $F(x_1, x_2, \ldots, x_n)$ corresponding to time T, identifying those samples for which $x \geq A$, and then using only these samples to estimate the probability that $y \geq B$. More generally, any conditional cdf of the form F(x|E) can be estimated similarly, where x is any function of the variables $(x_1, x_2, \ldots, x_n)$ and E is any event defined in terms of the variables $(x_1, x_2, \ldots, x_n)$.

Similarly, suppose an investor would like to know whether it is reasonable to believe that a certain stock or portfolio x will have a value greater than a given constant A at time T. This kind of question can be addressed by estimating the conditional cdf of some other related and perhaps better-understood variable (or combination of variables) y at time T, given that $x \geq A$. If the resulting distribution for y does not look reasonable, then the investor may conclude that it is unreasonable to expect that $x \geq A$.

For definiteness, let us suppose the first portfolio is x, where as above $$\ln x = \beta_0 \ln x_0 + \beta_1 \ln x_1 + \ldots + \beta_n \ln x_n, \quad (38a)$$

and the second portfolio is y, where $$\ln y = \gamma_0 \ln y_0 + \gamma_1 \ln x_1 + \ldots + \gamma_n \ln x_n \quad (38b)$$

We take $\beta_0=\gamma_0=1$, and view in $x_0$ and $\epsilon=\ln y_0$ as residuals with mean 0. The latter residual is not assumed to be a factor in our multivariate model. Consider the following typical "what-if" question: Let A and B be given positive constants. If we know $x \geq A$ at time T, what is the probability that $y \geq B$ at time P? We give two approaches to this problem, the first probably quicker, but possibly not as accurate, using a regression to avoid at least some Monte Carlo calculations.

In another example, consider in $y \geq \ln B$ if and only if in $y-\epsilon \leq \ln B-\epsilon$. All correlations $\rho_{ij}$ between $\ln x_i$ and $\ln x_j$ are assumed known. We may also assume that we have historical values of volatilities $$\sigma_i = \sqrt{\text{Var}(\ln x_i)}.$$

(Alternatively, we could estimate such values as expected values of implied volatilities, but it would not be difficult to maintain an inventory of historical values, and more in the spirit of this part of the calculation to do so.)

Thus we can estimate the historical covariances between $\ln x$ and $\ln y-\epsilon$:

$$\text{Cov}(\ln x, \ln y - \varepsilon) \approx \sum_{ij} \beta_i \sigma_i \rho_{ij} \gamma_j \sigma_j T, \quad (39)$$

as well as $$\sigma_{\ln x} = \sqrt{\text{Var}(\ln x)}, \, \sigma_{\ln y - \varepsilon} = \sqrt{\text{Var}(\ln y - \varepsilon)}$$

and the correlation $$\rho(\varepsilon) = \rho_{\ln x, \ln y - \varepsilon} = \frac{\text{Cov}(\ln x, \ln y - \varepsilon)}{\sigma_{\ln x} \sigma_{\ln y - \varepsilon}}.$$

This gives a standard regression for the variable $\ln y-\epsilon$ expressed in standard deviations from its mean, in terms of a similarly standardized expression for $\ln x$. Note that $\epsilon$ has mean 0 by construction. Put $$d_2(s^*, x, \sigma) = \frac{\ln(s^*/x) - \sigma^2 T/2}{\sigma \sqrt{T}}.$$

Thus $-d_2(s_x^*, x, \sigma_{\ln x})$ measures standardized $\ln x$ using historical volatility, and $-d_2(x)=-d_2(s_x^*, x, \hat{\sigma}_1(x))$ measures "standardized" (warped) $\ln x$ using the cdf-implied volatility curve $\hat{\sigma}_1(x)$, as discussed in the previous section. Here $s_x^*$ denotes our best estimate for the value of x at time T.

Let $\sigma_1(y, \epsilon)$ denote the volatility curve associated with in $y-\epsilon$ which may be estimated as in the previous section (or computed from estimates of $\sigma_1(y)$ and the standard deviation of the residual, if we are willing to view the residual as uncorrelated with $\ln y-\epsilon$, as is guaranteed in unconstrained regression). Put $d_2(y, \epsilon)=d_2(s_y^*, ye^{-\epsilon}, \hat{\sigma}_1(y:\epsilon))$, so that $-d_2(y, \epsilon)$ is a "standardized" measure of $\ln y-\epsilon$. Then the standard regression appropriate to our model is $$-d_2(y,\epsilon)=\rho(\epsilon)(-d_2(x)). \quad (40)$$

There is a residual associated with this regression, which we have not written down. It is presumably normal, and its variance may be computed. For notational reasons we will just imagine it has been incorporated into the original $\epsilon$. As is apparent from the form of the expressions in the display, an alternative to the above regression is to do it with the warped correlation coefficients suggested in the previous section. If, in addition, it was appropriate to view the original portfolios as linear combinations of warped variables (our standard normal marginals), the regression above could be done without any recourse to Monte Carlo calculations. Similar remarks would apply if we used constant historical volatility functions throughout, though presumably the latter procedure would lose accuracy.

In any case, we can now answer our "what-if" question as a simple expectation in the univariate normal distribution of the (adjusted) residual $\epsilon$. Abbreviate $d_2(s_x^*, A, \hat{\sigma}_1(A))$ to $d_2(A)$ and $d_2(s_y^*, Be^{-\epsilon}, \hat{\sigma}_1(B,\epsilon))$ to $d_2(B, \epsilon)$. Assume $\rho(\epsilon)>0$ (the natural case of a positive correlation). Then we have $$Pr\{y \geq B \mid x \geq A\} = E(Pr(-d_2(y, \varepsilon) \geq -d_2(B, \varepsilon) \mid -d_2(x) \geq d_2(A)) \quad (41)$$

$$= E(Pr(-d_2(x) \geq \rho(\varepsilon)^{-1} -$$

$$d_2(B, \varepsilon) \mid -d_2(x) \geq -d_2(A)).$$

$$= E(\min\{1, N(\rho(\varepsilon)^{-1}(d_2(B, \varepsilon))/N(d_2(A))\})$$

The first equation follows just because $-d_2(y, \epsilon)$ is monotonically increasing as a function of y; that is, the condition that $y \geq B$ is completely equivalent to the condition $-d_2(y, \epsilon) \geq -d_2(B, \epsilon)$. Similar remarks hold for the condition $x \geq A$, while the expression $Pr\{y \geq B|x \geq A\}$ just means the probability that the condition $y \geq B$ holds when it is known that $x \geq A$. The second equation is then derived with the displayed expression above for $-d_2(y, \epsilon)$. (If $\rho(\epsilon)$ is negative, the inequality involving its inverse reverses.) This inner expectation is then calculated in the normal distribution. For values of $\epsilon$ for which $-d_2(A))$ is as large as $\rho(\epsilon)^{-1}(-d_2(B, \epsilon))$ the expectation is a certainty, and yields the value 1. When $-d_2(A)$ is smaller than $\rho(\epsilon)^{-1}(-d_2(B, \epsilon))$, its cumulative normal distribution value $N(-d_2(A))$ is smaller than $N(\rho(\epsilon)^{-1}(-d_2(B, \epsilon))$, and the probability $1-N(-d_2(A))=N(d_2(A))$ that the standard normal variable $z=-d_2(x)$ is at least $-d_2(A)$ is smaller than the corresponding probability $1-N \rho(\epsilon)^{-1}(-d_2(B, \epsilon))=Np(\epsilon)^{-1}(d_2(B, \epsilon))$ that z be at least $\rho(\epsilon)^{-1}(-d_2(B, \epsilon))$. The ratio $N(\rho(\epsilon)^{-1}(d_2(B, \epsilon))/N(d_2(A))$, which is the desired inner expectation, is thus smaller than 1, as is appropriate for a probability, conditional or not. If $\rho(\epsilon)$ is negative, similar reasoning leads instead to the expression $E(\max\{0, (N(d_2(A))-N(\rho(\epsilon)^{-1}(d_2(B, \epsilon)))/N(d_2(A))\})$ for the desired conditional probability.

Although the final answer in either case is an expectation (over $\epsilon$), it is essentially an integral that could be computed quickly with power series. (A very simple and accurate power-series expansion of $N(z)$ is given on p. 252 of the book by Hull cited above.) Using that, one could determine by iterative methods what value of $\epsilon$ makes, say, the ratio $N(\rho(\epsilon)^{-1}(d_2(B, \epsilon)))/N(d_2(A))$ equal to 1, and then integrate the ratio against the standard normal pdf from $-\infty$ to the determined value of $\epsilon$ in the $\rho(\epsilon)>0$ case. Similar remarks apply if $\rho(\epsilon)<0$. (Note that, if $\rho(\epsilon)=0$, the variables $\ln x$ and $\ln y$ are uncorrelated, and the conditional probability $Pr\{y \geq B|x \geq A\}$ is the same as the unconditional probability $Pr\{y \geq B\}$.)

All of the latter calculations can be done very fast. Of course, we have already used some Monte Carlo calculations to get this far, unless we are in the simplified context of constant volatility functions.

In some examples, it is easy to say how we would compute an answer to the same "what-if" question, using our full joint probability distribution. We simply write $$Pr\{y \geq B | x \geq A\} = E(Pr(-d_2(y,\epsilon) \geq -d_2(B,\epsilon) | -d_2(x) \geq -d_2(A))) \quad (42)$$

and interpret ln x in $-d_2(x)$, and ln y–$\epsilon$ in $-d_2(y, \epsilon)$ in terms of their expansions in ln $x_0$, ln $x_i$, ..., ln $x_n$. To compute, say the inner expectation by a Monte Carlo calculation, we would generate a large number of random samples of multivariate standard normal vectors z with covariance matrix C. We then take the average, over the samples z which happen to satisfy $z \geq -d_2(A)$, of the function which is 1 when $-d_2(y, \epsilon) \geq -d_2(B, \epsilon)$ and 0 otherwise. We have not experimented to see whether this method yields better answers than the regression procedure above. Nevertheless, it illustrates how we could approach more sophisticated "what-if" questions that could not be easily treated by regressions. For example, suppose we believe that factor w will remain in a range $C \leq w \leq D$, and ask the same question about y, subject to the same condition on x. This is hard to formulate in terms of regression, end is simply not possible in terms of single-factor regression. However, it is easy to answer with the full distribution:

$$Pr\{y \geq B | x \geq A, C \leq w \leq D\} = E(Pr\{-d_2(y,\epsilon) \geq -d_2(B,\epsilon) | -d_2(x) \geq d_2(A)\}, -d_2(C) \leq -d_2(w) \leq -d_2(D))) \quad (43)$$

Finally, we may not want to work in the log domain, which, if we started with a fixed portfolio $x = h_1 x_1 + h_2 x_2 + h_n$, would force us into an approximation, as noted. But, working with the full distribution, we can phrase a condition $x \geq A$ as $h_1 x_1 (y_1) + \ldots + h_n x_n(y_n) \geq A$, in the language of the first section where the vector of ys plays the role of our vector z here. Monte Carlo calculations can now proceed as before, using log domain expressions or not for the other conditions.

In the previous examples we were focusing on an investor thinking about the value of his or her portfolio y in response to the change in a factor x. Conversely, an investor might want to know what the investment world looks like if a given stock or index y goes to a certain level B at time T. What is the expected value A at time T of another portfolio x, or simply of one of the factors $x_i$? One approach is, upon input by the user that y is going to level B, to list several assets $x_i$ or factors/indices x most highly correlated with y and their expected values with y at B.

It is also possible to display a confidence interval for each selected asset or factor, and have other information about its new projected probability distribution readily available. We could also offer comparisons with the old projected probability distribution of x, where no assumptions on y is made. Finally, in some cases, where it was possible to explain much of the variance of y with just a few $x_i$ (appearing in the regression of y), we could list percentage increases/decreases of a portfolio of these $x_i$ required to make B the expected value of y, based solely on its dependence on this portfolio. (For example, the coefficients in the portfolio could come from the regression of y with respect to all the $x_i$, or some new regression might be done, perhaps allowing user-defined constraints). It should be mentioned that medians or modes are alternatives to expected values (means) here and above; in any case users will need to be educated about the fact that the median and mode differ systematically from the mean in near lognormal distributions.

The main problem might be viewed as understanding the probability distribution of x, given that $y \geq B$ at a given time T, with x and y as in the previous section. This can be approached by the methods of the previous sections, by reversing the roles of the variables.

There is, however, a simpler question that can be treated in an especially quick way. Consider the problem of determining the mean of x conditioned on the equality y=B at time T. The idea is to use simple regression methods, but interpret answers as measured in terms of our variable volatilities. In our previous notation, we have a regression $$-d_2(x) = \rho \cdot (-d_2(y,\epsilon)) + v \quad (44)$$

where $\rho$ (which we coded $\rho(\epsilon)$ in the previous section) is the historically determined correlation between ln x and the random variable ln y–$\epsilon$. Note that the roles of dependent and independent variable are reversed. There is also a residual v, which has mean 0 here, and plays no role (gets averaged away). Thus, the desired conditional expected value A of x is obtained from $$-d_2(A) = E(-d_2(x) | y=B) = \rho \cdot E(-d_2(sy^*, Be^{-\epsilon}, \hat{\sigma}_1(y,\epsilon))) = \rho \cdot (-d_2(s_y^*, B, \hat{\sigma}_1(y,\epsilon))). \quad (45)$$

Recall that $\hat{\sigma}_1(y,\epsilon)$ is an estimate, obtained by Monte Carlo methods, of the implied volatility $\sigma_1$ associated to the random variable ln y–$\epsilon$. For faster but less accurate calculations it can be estimated historically as $\Sigma_{ij} \beta_i \sigma_i \rho_{ij} \beta_j \sigma_j$ with each of the $\sigma$s, $\beta$s, and $\rho$s here given historically. (See the previous section for notation.) Similarly, for fast calculations, $-d_2(x)$ could use historical volatility, though we expect it to be given more accurately, or rater, more accurately according to the market view, as $-d_2(x) = -d_2(s_x^*, x, \hat{\sigma}_1(x))$, using the implied volatility function estimate $\hat{\sigma}_1(x)$. If $x = x_i$ is a single asset or index in our model, then $\hat{\sigma}_1(x) = \hat{\sigma}_1(x_i)$ does not require a Monte Carlo estimate, but is presumably already available.

To summarize, the conditional expected values required to answer such questions are easily obtained by regression methods. The accuracy of such answers is enhanced, or at least shaped more to reflect market input, when all logvariables are measured in "standard deviations," interpreted as our variable volatilities.

In some examples, these methods, when using full Monte Carlo calculations, easily apply to portfolios containing option securities. The well-known idea is to think of an option as a kind of nonlinear portfolio—a quadratic one, to be more precise. Thus, an option on a single underlying security with underlying price $x_1$ has a price approximately $x = c + \Delta(x_1 - s_1) + (½)\Gamma(x_1 - s_1)^2$ for $x_1$ near $s_1$, where the option was evaluated to a known value c. Here $\Delta$ and $\Gamma$ are well-known parameters in the options markets, giving the first and second derivatives of the option price at $s_1$ with respect to the underlying security price $x_1$. Perhaps the most characteristic feature of options is that they have nonzero $\Gamma$—their proportion of increase or decrease with respect to the underlying security price changes as the security price changes. Explicit formulas in terms of other standard parameters are available, say, in the Black-Scholes theory for both $\Delta$ and $\Gamma$ (see the Hull book cited above). Such formulas could be obtained by differentiation directly in other theories or when using empirically-fitted curves. In any case, once we have such an explicit approximation to x, its probability distribution is easily given by the Monte Carlo process described above. The same method applies as well to portfolios containing several options and other securities.

Applications that Use the Probability Distribution Information

A wide variety of techniques may be used to accumulate and process the information needed for the calculations described above and to provide the information to users directly or indirectly through third parties. Some of these techniques are described below.

Figure 4:
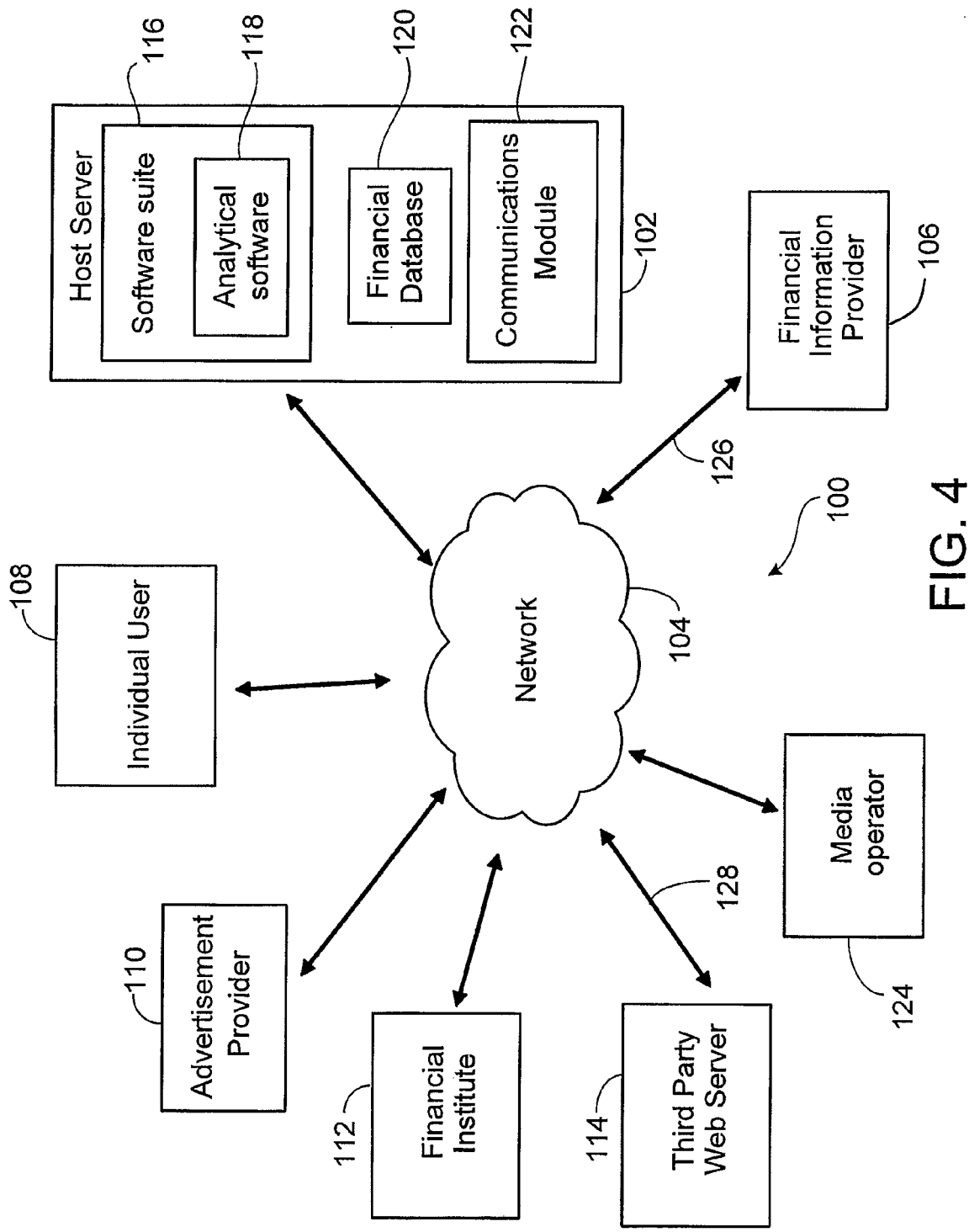

As shown in FIG. 4, the probability distribution information can be provided to users from a host server 102 connected to a communication network 104, for example, a public network such as the Internet or a private network such as a corporate intranet or local area network (LAN). For purpose of illustration, the following discussion assumes that network 104 is the Internet.

The host server 102 includes a software suite 116, a financial database 120, and a communications module 122. The communications module 122 transmits and receives data generated by the host server 102 according to the communication protocols of the network 104.

Also connected to the network are one or more of each of the following (only one is shown in each case): an individual or institutional user 108, an advertisement provider 110, a financial institution 112, a third party web server 114, a media operator 122, and a financial information provider 106.

The operator of the host server could be, for example, a financial information source, a private company, a vendor of investment services, or a consortium of companies that provides a centralized database of information.

The host server 102 runs typical operating system and web server programs that are part of the software suite 116. The web server programs allow the host server 102 to operate as a web server and generate web pages or elements of web pages, e.g., in HTML or XML code, that allow each user 108 to receive and interact with probability distribution information generated by the host server.

Software suite 116 also includes analytical software 118 that is configured to analyze data stored in the financial database 120 to generate, for example, the implied probability distribution of future prices of assets and portfolios.

The financial database 120 stores financial information collected from the financial information providers 106 and computation results generated by the analytical software 118. The financial information providers 106 is connected to the network 104 via a communication link 126 or the financial information providers may feed the information directly to the host server through a dialup or dedicated line (not shown).

FIG. 4 gives a functional view of an implementation of the invention. Structurally, the host server could be implemented as one or more web servers coupled to the network, one or more applications servers running the analytical software and other applications required for the system and one or more database servers that would store the financial database and other information required for the system.

Figure 10:
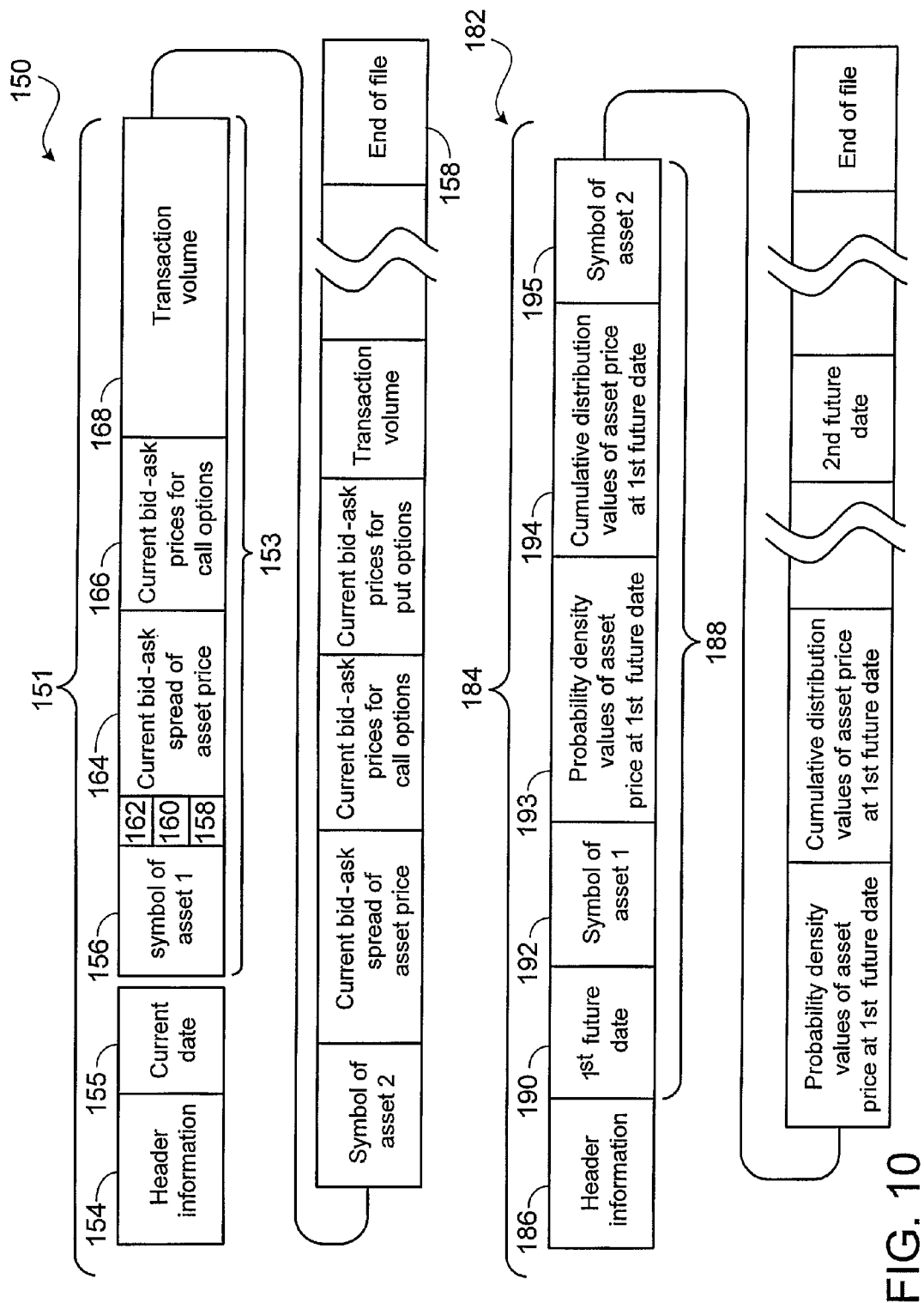
FIG. 10 shows data structures.

FIG. 10 shows an example of a data feed 150 sent from the financial information provider 106 to the host server 102 through the communication link 126. Information is communicated to the host server in the form of messages 151, 152. Each message contains a stream of one or more records 153 each of which carries information about option prices for an underlying asset. Each message includes header information 154 that identifies the sender and receiver, the current date 155, and an end of message indicator 158, which follows the records contained in the message.

Each record 153 in the stream includes an identifier 156 (e.g., the trading symbol) of an underlying asset, an indication 158 of whether the record pertains to a put or call, the strike date 160 of the put or call, the strike price 162 of the put or call, current bid-ask prices 164 of the underlying asset, bid-ask prices 166 for the option, and transaction volumes 168 associated with the option. The financial information provider 106 may be an information broker, such as Reuters, Bridge, or Bloomberg, or any other party that has access to or can generate the information carried in the messages. The broker may provide information from sources that include, for example, the New York Stock Exchange and the Chicago Board of Options Exchange.

The financial database 120 stores the information received in the information feed from the financial information providers and other information, including, for example, interest rates and volatilities. The financial database also stores the results generated by the analytical software, including probability distribution functions with respect to the underlying assets and assets that are not the subject of options.

The probability distribution information is generated continually (and essentially in real time) from the incoming options data so that the information provided and displayed to users is current. That is, the information is not based on old historical data but rather on current information about option prices.

In addition, other soft information can be accumulated, stored, and provided to users, including fundamental characteristics of the underlying assets, including prices, volatility values, beta, the identification of the industry to which the asset belongs, the yield, the price to book ratio, and the leverage. Other information could include calendars of earnings forecast dates, earnings forecasts, corporate action items, news items that relate to an industry, and the volume of institutional holdings.

The messages from the information provider 106 may be sent in response to requests by the host server 102, the information may be sent to the host server 102 automatically at a specified time interval, or the information may be sent as received by the information provider from its sources. The financial database 120 may be maintained on a separate server computer (not shown) that is dedicated to the collection and organization of financial data. The financial database is organized to provide logical relationships among the stored data and to make retrieval of needed information rapid and effective.

The user 108 may use, for example, a personal computer, a TV set top box, a personal digital assistant (PDA), or a portable phone to communicate with the network 104. Any of these devices may be running an Internet browser to display the graphical user interface (GUI) generated by the host server 102.

The host server 102 may provide probability distribution information on the network 104 in the form of web pages and allow the individual user 108, the financial institution 112, the third party web server 114, and the media operator 124 to view the information freely. The host company that runs the host server 102 may generate revenue by, for example, selling advertisement space on its web pages to an advertisement provider 110.

The host server 102 may also provide proprietary information and enhanced services to individual users 108, financial institutions 112, third party web servers 114, and media operators 122 for a subscription fee.

The host server 102 may have a direct link to the financial institutions 112 to provide tailored information in a format that can be readily incorporated into the databases of the financial institutions 112. Financial institutions 112 may include, for example, investment banks, stock brokerage firms, mutual fund providers, bank trust departments, investment advisers, and venture capital investment firms. These institutions may incorporate the probability distribution information generated by the analytical software 118 into the financial services that they provide to their own subscribers. The probability distribution information provided by the host server 102 enables the stock brokerage firms to provide better advice to their customers.

A third party web server 114 may incorporate probability distribution information into its web site. The information may be delivered in the form of an information feed to the third party host of web server 114 either through the Internet or through a dedicated or dial-up connection.

FIG. 10 shows an example of a data feed 182 sent from the host server 102 to the third party web server 114 through communication link 128. Data feed 182 carries messages 184 that include header information 186, identifying the sender and receiver, and records 188 that relate to specific underlying assets.

Each record 188 includes an item 190 that identifies a future date, a symbol 192 identifying the asset, risk-neutral probability density information 193 and cumulative distribution information 194. The record could also include a symbol identifying a second asset 195 with respect to the identified future date, and so on. Other information could be provided such as a risk premium value with respect to the risk-neutral values.

Examples of third party web servers 114 are the web servers of E*TRADE, CBS MarketWatch, Fidelity Investments, and The Wall Street Journal. The third party web server 114 specifies a list of assets for which it needs probability distribution information. Host server 102 periodically gathers information from financial information provider 106 and its own financial database 120, generates the probability distribution information for the specified list of assets, and transmits the information to the third party web server 114 for incorporation into its web pages.

Examples of the media operator 124 are cable TV operators and newspaper agencies that provide financial information. For example, a cable TV channel that provides stock price quotes may also provide probability distribution information generated by the host server 102. A cable TV operator may have a database that stores the probability distributions of all the stocks that are listed on the NYSE for a number of months into the future. The host server 102 may periodically send updated information to the database of the cable TV operator. When a subscriber of the cable TV channel views the stock price quotes on a TV, the subscriber may send commands to a server computer to the cable TV operator via modem to specify a particular stock and a particular future date. In response, the server computer of the cable TV operator retrieves the probability distribution information from its database and sends the information to the subscriber via the cable network, e.g., by encoding the probability distribution information in the vertical blank interval of the TV signal.

Likewise, a newspaper agency that provides daily transaction price quotes may also provide the probabilities of stock prices rising above certain percentages of the current asset prices at a predetermined future date, e.g., 6 months. A sample listing on a newspaper may be "AMD 83 88 85 ▲40%", meaning that the AMD stock has a lowest price of $83, highest price of $88, a closing price of $85 that is higher than the previous closing price, and a 40% probability of rising 10% in 6 months.

The analytical software 118 may be written in any computer language such as Java, C, C++, or FORTRAN. The software may include the following modules: (1) input module for preprocessing data received from the financial data sources; (2) computation module for performing the mathematical analyses; (3) user interface module for generating a graphical interface to receive inputs from the user and to display charts and graphs of the computation results; and (4) communications interface module for handling the communications protocols required for accessing the networks.

Web Pages and User Interfaces

A variety of web pages and user interfaces can be used to convey the information generated by the techniques described above.

Figure 5:
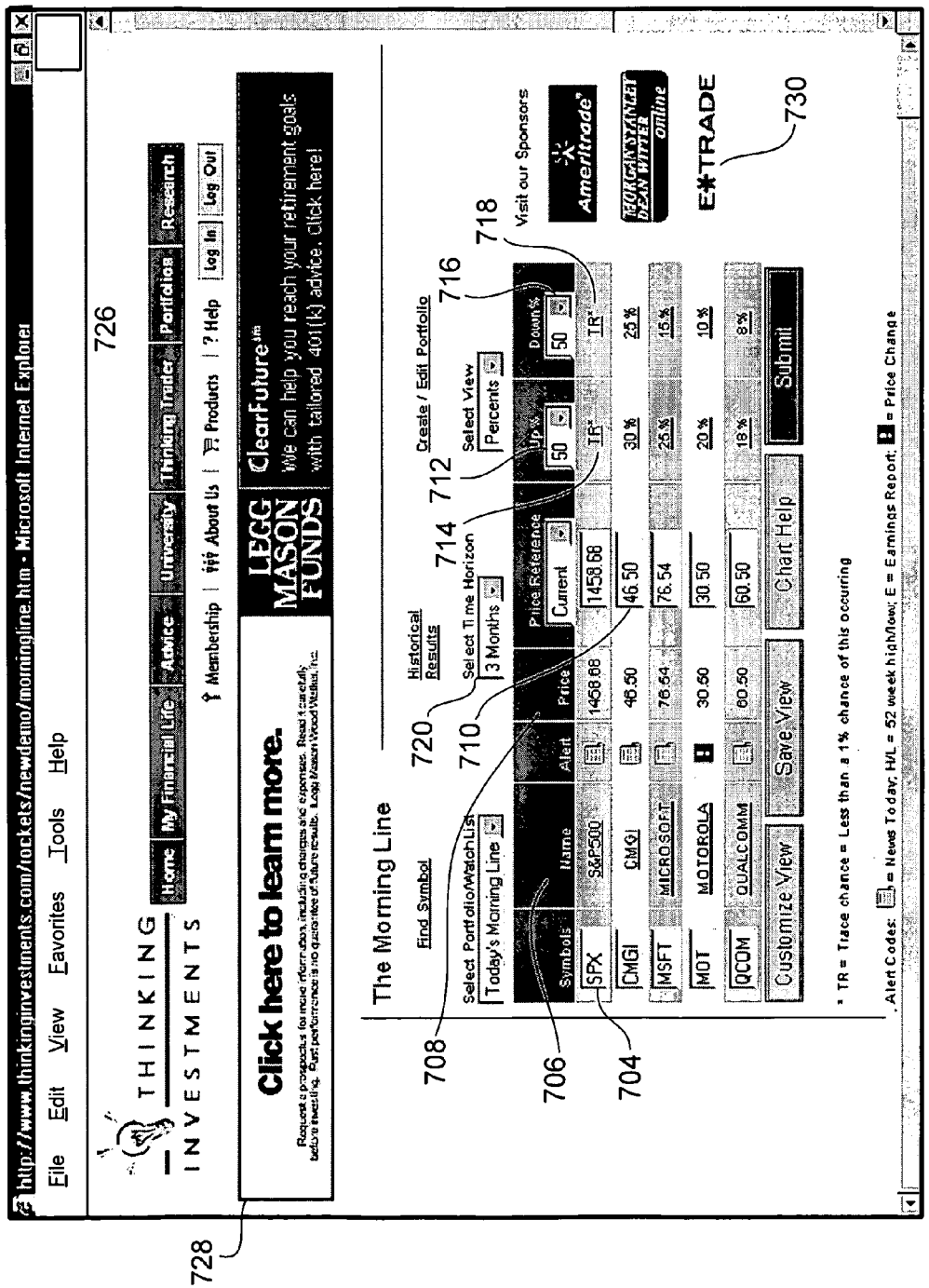

For example, referring to FIG. 5, a GUI 700 enables a user 108 to obtain a range of financial services provided by the host server 102. The user 108 may see the implied probabilities of future prices of marketable assets 706 having symbols 704 and current prices 708. The information displayed could include the probabilities 714 (or 718) of the asset prices rising above a certain specified percentage 712 (or falling below a certain specified percentage 716) of the reference price 710 within a specified period of time 720.

For the convenience of the user 108, GUI 700 includes links 730 to institutions that facilitate trading of the assets. The host company that runs the host server 102 sells advertising space 728 on the GUI 700 to obtain revenue. The GUI 700 also has links 726 to other services provided by the host server 102, including providing advice on lifetime financial management, on-line courses on topics related to trading of marketable assets, research on market conditions related to marketable assets, and management of portfolios of assets.

Figure 6:
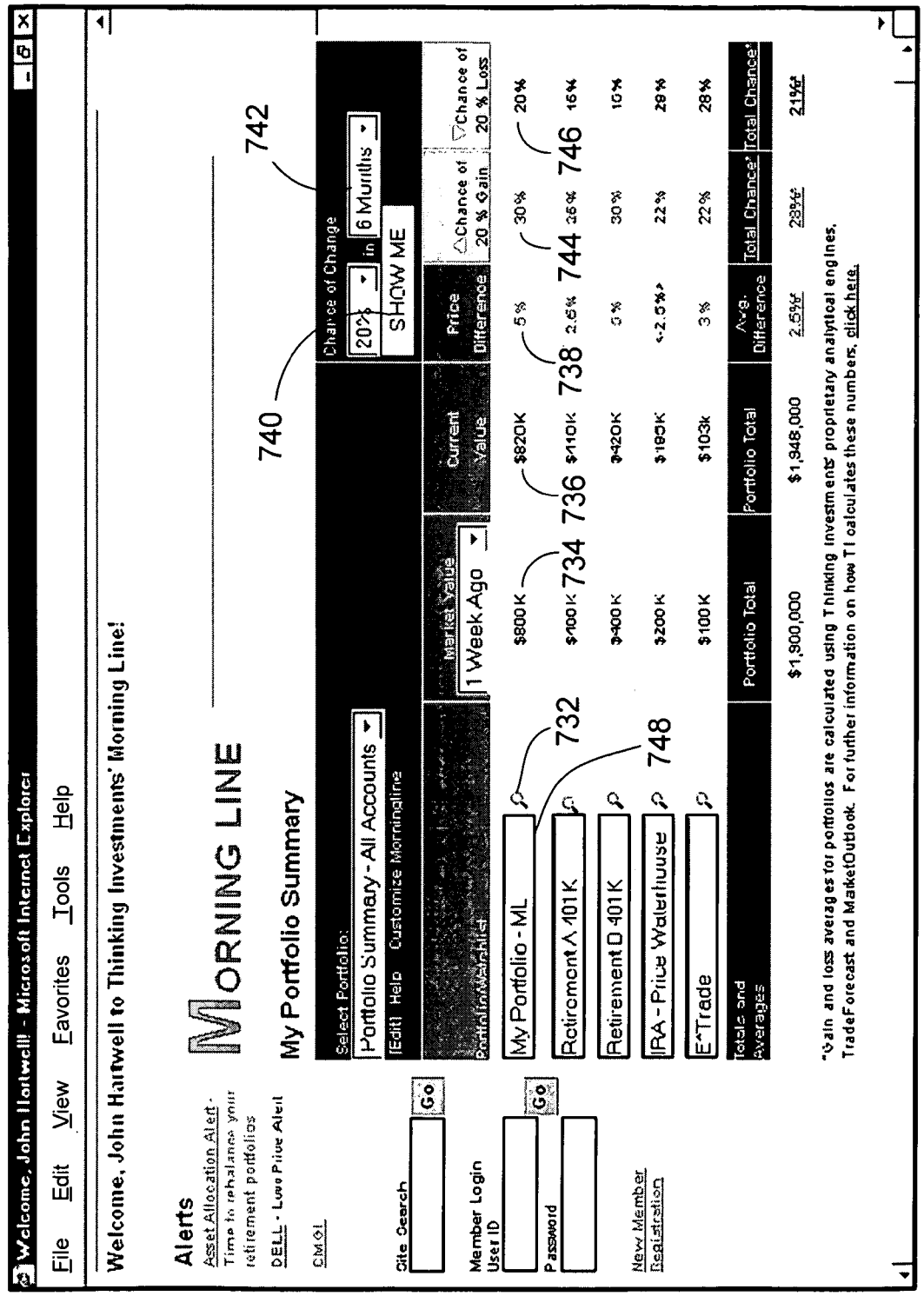

Referring to FIG. 6, the GUI 700 also may display an interactive web page to allow the user 108 to view the market's current prediction of future values of portfolios of assets. The past market price 734 and current market price 736 of the asset portfolios 732 are displayed. Also displayed is the price difference 738. The GUI 700 displays the probability 744 (or 746) that the portfolio 732 will gain (or lose) a certain percentage 740 within a specified time period 742. Examples of portfolios include stock portfolios, retirement 401K plans, and individual retirement accounts. Links 748 are provided to allow the user 108 to view the market's current forecast of future price trends of the individual assets within each portfolio.

Figure 7:
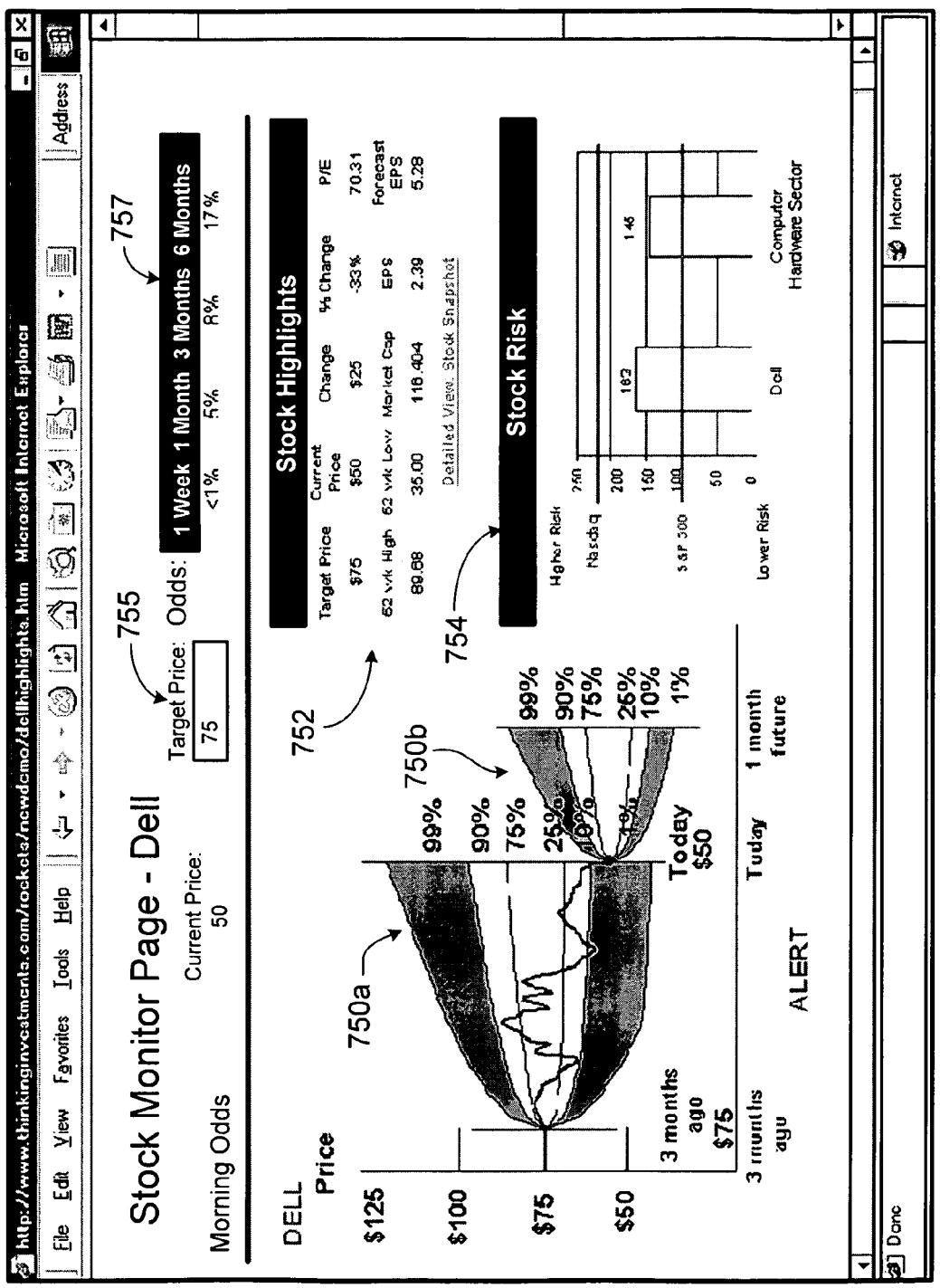

Referring to FIG. 7, in another user interface, the GUI 700 displays an interactive web page that includes detailed analyses of past price history and the market's current forecast of the probability distribution of the future values of a marketable asset over a specified period of time. The GUI 700 includes price-spread displays 750 representing the cumulative distribution values of the predicted future prices of an asset over periods of time. The price-spread display 750a shows the price distribution data that was generated at a time three months earlier. A three-month history of the actual asset prices is shown as a line graph for comparison to give the user 108 a measure of the merit of the price distribution information. The price-spread display 750b represents the predicted cumulative distribution values of the asset prices over a period of one month into the future. The left edge of display 750b, of course, begins at the actual price of the asset as of the end of the prior three-month period, e.g., the current DELL stock price of $50. The probability distribution information implies, for example, a 1% probability that the stock price will fall below $35, and a 99% probably that the stock price will fall below $80 in one month. GUI 700 includes table 752 that shows highlights of asset information and graph 754 that shows sector risks of the asset. A box 755 permits a user to enter a target price and table 757 presents the probability of that price at four different future times, based on the calculated implied probability distributions.

Figure 8:
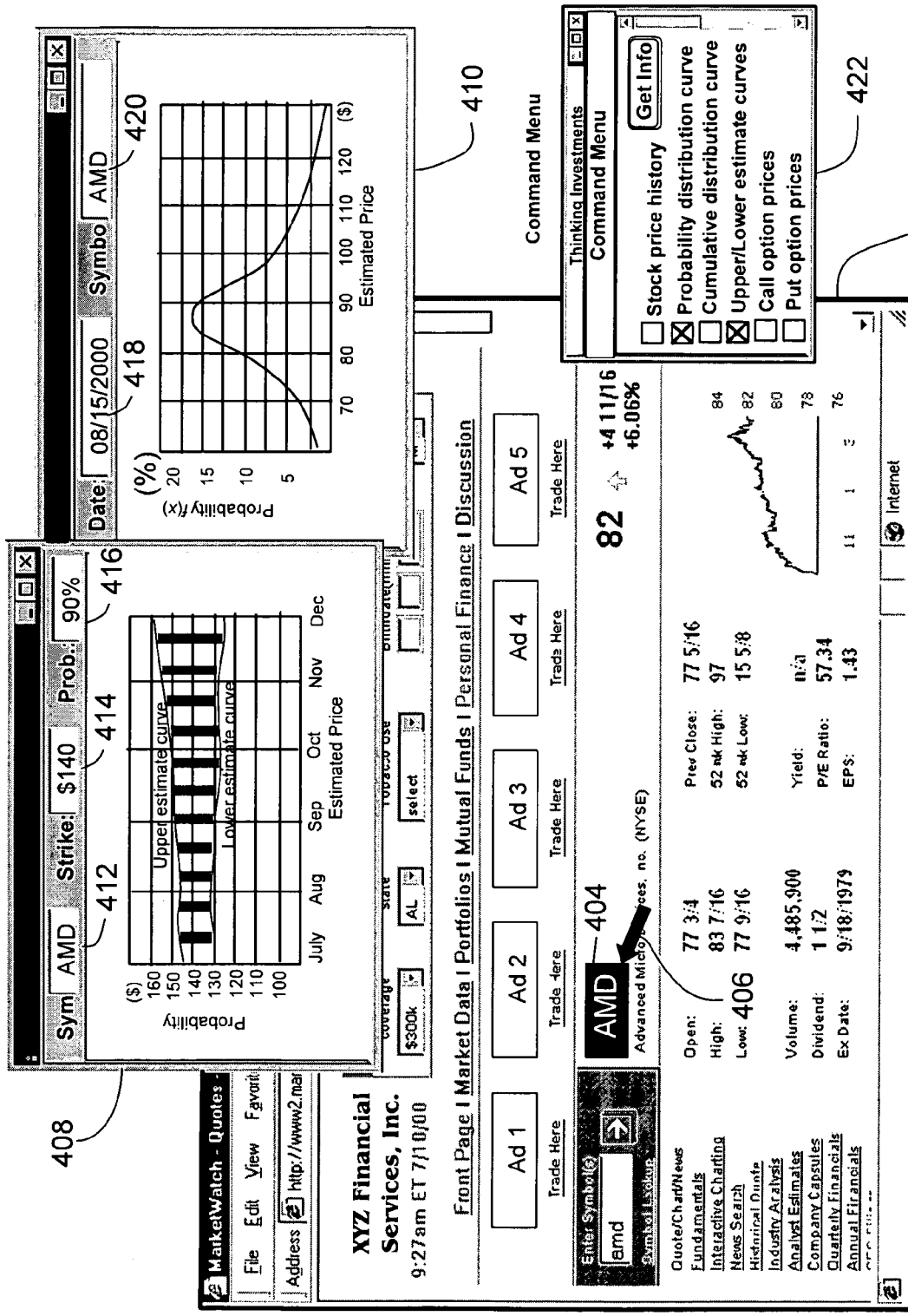
FIGS. 8 and 9 illustrate user interfaces.

Referring to FIG. 8, in another approach, a window 402 is displayed on a user's screen showing financial information along with two other windows 408 and 410 showing probability distribution information. The individual user 108 could have previously downloaded a client program from the host server 102. When the user is viewing any document, e.g., any web page (whether of the host server 102 or of another host's server), the user may highlight a stock symbol 404 using a pointer 406 and type a predetermined keystroke (e.g., "ALT-SHIFT-Q") to invoke the client program. The client program then sends the stock symbol as highlighted by the user to the host server 102. The host server 102 sends probability distribution information back to the client program, which in turn displays the information in separate windows 408 and 410.

When the client program is invoked, a window 422 may be displayed showing the different types of price information that can be displayed. In the example shown, the "Probability distribution curve" and "Upper/lower estimate curves" are selected. Window 408 shows the price range of AMD stock above and below a strike price of $140 from July to December, with 90% probability that the stock price will fall between the upper and lower estimate curves. Window 410 shows the probability density curve $f(x)$ for AMD stock for a future date of Aug. 15, 2000. The user may also specify a default function curve, such that whenever an asset name is highlighted, the default function curve is displayed without any further instruction from the user.

Tabular data such as those shown in TABLE 1 may be generated by the host server 102 and transmitted over the network 104 to devices that have limited capability for displaying graphical data. As an example, the individual user 108 may wish to access asset probability distribution information using a portable phone. The user enters commands using the phone keypad to specify a stock, a price, and a future date. In response, the host server 102 returns the probability of the stock reaching the specified price at the specified future date in tabular format suitable for display on the portable phone screen.

Figure 9:
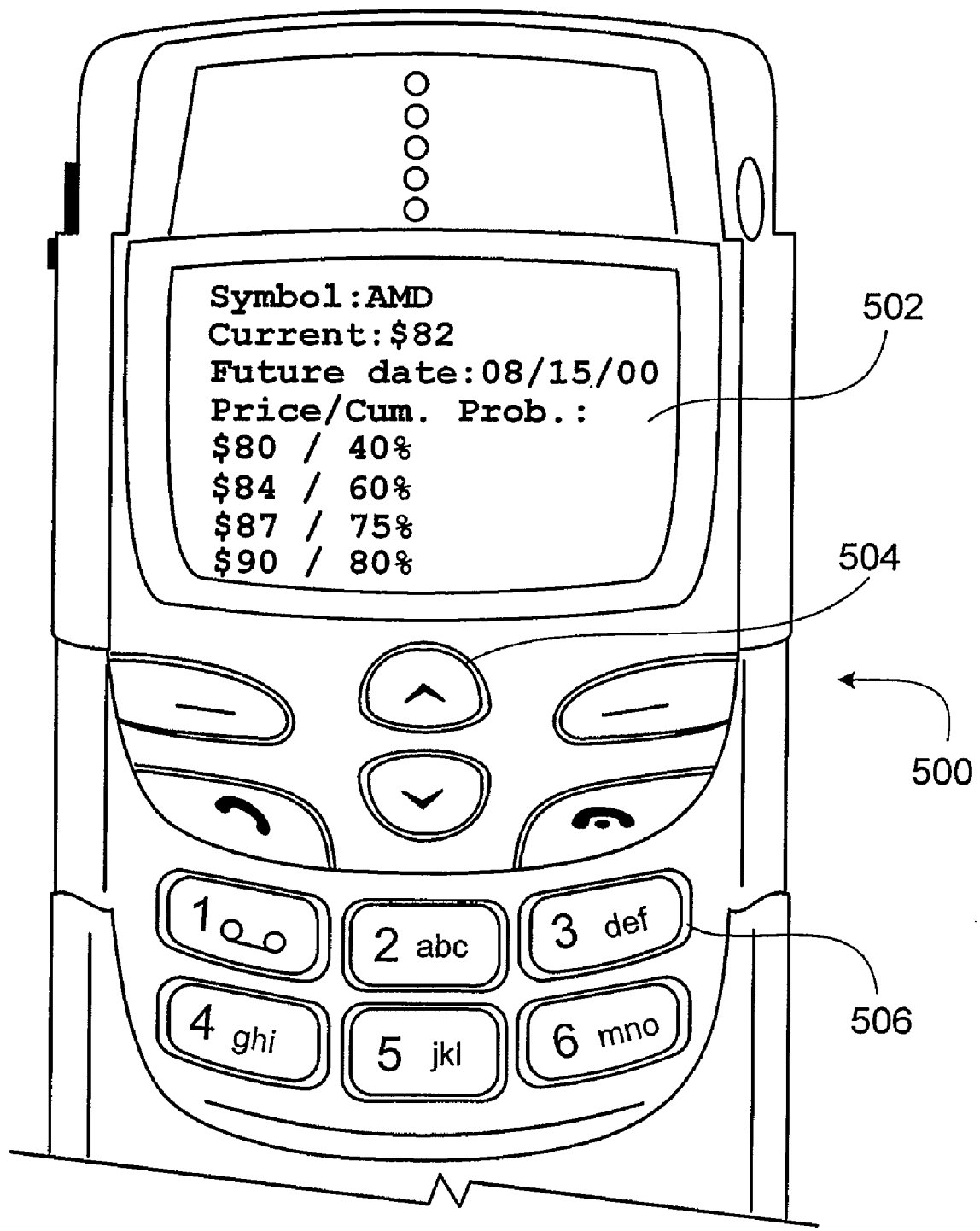

Referring to FIG. 9, a portable phone 500 includes a display screen 502, numeric keys 506, and scrolling keys 504. A user may enter commands using the numeric keys 506. Price information received from the host server 102 is displayed on the display screen 502. Tabular data typically includes a long list of numbers, and the user may use the scroll keys 504 to view different portions of the tabular data.

In the example shown in display screen 502, the AMD stock has a current price of $82. The cumulative distribution values $F(x)$ for various future prices on Aug. 15, 2000 are listed. The distribution indicates a 40% probability that the stock price will be below $80 implying a 60% probability of the stock price being above $80. Likewise, the distribution indicates an 80% probability that the stock price will be at least $90, implying a probability of 20% of the stock price being above $90.

Other embodiments are within the scope of the following claims.

What is claimed is:

1. A machine-based method for predicting, for use by or on behalf of an investor, a joint multivariate probability distribution, of probabilities of values of multiple items occurring simultaneously at a future time, the multiple items comprising assets at least some of which are associated with data on prices of two or more options for each of the assets for an earlier time, the two or more options for each of the assets having corresponding different strike prices of the asset at the future time, the method comprising:

by computer, deriving from the prices of the options for the earlier time, univariate probability distributions, for respective individual ones of the assets, of values of the asset at the future time, the derivation of each of the univariate probability distributions including
  a smoothing operation performed on the prices of the options as a function of the corresponding strike prices, and
  a first derivative operation on a result of the smoothing operation to obtain the univariate probability distribution, and by computer, deriving the joint multivariate probability distribution based on (a) the univariate probability distributions, and (b) a requirement that there be agreement of (i) correlations of returns of pairs of items, at the future time, that are represented by the derived joint multivariate probability distribution, with (ii) correlations of returns for pairs of the items, that occurred historically, prior to the earlier time; and presenting information associated with the derived joint multivariate probability distribution to a user as a prediction of the probabilities of simultaneous values of the items at the future time.

2. The machine-based method of 1, in which, for at least some items that have no or insufficient option prices available with respect to the earlier time, the univariate probability distributions of values of the assets at the future time are obtained from commercial factor model estimates of price probability distribution parameters.

3. The machine-based method of claim 1, also comprising, on a computer system, deriving, from the joint multivariate probability distribution, a portfolio probability distribution for a value of a portfolio at the future time, based on joint probabilities of simultaneous values of a subset of items whose weighted sum yields the value of the portfolio.

4. The machine-based method of claim 3 in which the value of the portfolio represents or approximates a mutual fund value.

5. The machine-based method of claim 3 in which the value of the portfolio represents a value of assets for some or all of which there are no option prices available.

6. The machine-based method of claim 3, in which the portfolio probability distribution is derived by modeling on a computer system a smoothed and extrapolated volatility function that represents a variable standardizing parameter for a logarithm of the at least one portfolio value.

7. The machine-based method of claim 6, in which the parameter is used as a standard deviation to estimate on a computer system probabilities for the logarithm of the portfolio values from a standard normal distribution.

8. The machine-based method of claim 6, comprising providing estimates for assets approximated by portfolios represented in the multivariate probability distribution, in which the volatility function is modeled as an option-implied volatility curve and fit by regression, on a computer system, sampling from the multivariate probability distribution.

9. The machine-based method of claim 7, comprising providing estimates for assets approximated by portfolios represented in the multivariate probability distribution, in which the volatility function is modeled as an option-implied volatility curve and fit by regression, on a computer system, sampling from the multivariate probability distribution.

10. The machine-based method of claim 3, 6, 7, or 9, comprising using a proposed value or range of values of a first portfolio at the future time to estimate, on a computer system, a probability that a second portfolio will have a particular range of values at the second, future time.

11. The machine-based method of claim 10, comprising displaying, on a computer system, confidence intervals and a mean, median, or mode of the distribution of the second portfolio, conditioned on the proposed value or range of values for the first portfolio.

12. The machine-based method of claim 10 in which either the first or the second portfolio, or both, may have options among their component assets.

* * * * *

UNITED STATES PATENT AND TRADEMARK OFFICE
CERTIFICATE OF CORRECTION

| | | |
|---|---|---|
| PATENT NO. | : 7,930,232 B2 | Page 1 of 1 |
| APPLICATION NO. | : 12/139669 | |
| DATED | : April 19, 2011 | |
| INVENTOR(S) | : Philip A. Cooper | |

It is certified that error appears in the above-identified patent and that said Letters Patent is hereby corrected as shown below:

Column 30, Line 13, in Claim 2, delete "of" and insert -- of claim --, therefor.

Signed and Sealed this
Fifth Day of July, 2011

David J. Kappos
*Director of the United States Patent and Trademark Office*